United States Patent
Hashimoto et al.

[11] Patent Number: 6,079,581
[45] Date of Patent: Jun. 27, 2000

[54] FUEL FEED PORT SEALING APPARATUS

[75] Inventors: Hideharu Hashimoto; Nobuhito Hirakawa, both of Sanda; Takashi Kato, Okazaki, all of Japan

[73] Assignee: Nippon Pillar Packing Co., Ltd., Osaka, Japan

[21] Appl. No.: 09/122,178

[22] Filed: Jul. 24, 1998

[30] Foreign Application Priority Data

Jul. 24, 1997 [JP] Japan .................................. 9-215787

[51] Int. Cl.[7] ................................. B65B 3/00; B65B 1/04
[52] U.S. Cl. ......................... 220/86.2; 123/516; 141/312
[58] Field of Search ................................. 220/86.1, 86.2, 220/86.3; 123/516; 141/312, 368, 370

[56] References Cited

U.S. PATENT DOCUMENTS

| | | | |
|---|---|---|---|
| 3,016,161 | 1/1962 | Peplin | 220/86.2 |
| 3,903,942 | 9/1975 | Vest | 141/312 |
| 3,912,117 | 10/1975 | Ryding | 220/86.2 |
| 4,898,395 | 2/1990 | Kawase | 220/86.2 |
| 4,915,249 | 4/1990 | Anhegger | 220/86.1 |
| 5,035,272 | 7/1991 | Kawase | 220/86.1 |
| 5,234,039 | 8/1993 | Aoshima | 220/86.2 |
| 5,305,903 | 4/1994 | Harde | 141/312 |
| 5,427,263 | 6/1995 | Bowles | 220/86.2 |
| 5,538,055 | 7/1996 | Kunz | 141/312 |
| 5,732,840 | 3/1998 | Foltz | 220/86.2 |
| 5,937,922 | 8/1999 | Hor | 141/312 |

FOREIGN PATENT DOCUMENTS 2-114258  9/1990  Japan.

*Primary Examiner*—Carl S. Miller
*Attorney, Agent, or Firm*—Jacobson, Price, Holman & Stern, PLLC

[57] ABSTRACT

A sealing member is provided at an inner periphery sealing portion thereof with an inner tube portion arranged to be moved toward a fuel feed port inner side with the insertion of a fuel feed nozzle and to be moved toward a fuel feed port opening side with the removal of the fuel feed nozzle. The inner tube portion is provided, at the outer periphery of the end thereof at the fuel feed port opening side, with a tapered tube portion extending toward an outer tube portion side. With the movement of the inner tube portion toward the fuel feed port opening side, the inner tube portion is increased in inner diameter such that the increased inner diameter is greater than the outer diameter of the fuel feed nozzle, and with the movement of the inner tube portion toward the fuel feed port inner side, the inner tube portion is reduced in inner diameter, causing the same to stick fast to the outer periphery of the fuel feed nozzle.

13 Claims, 16 Drawing Sheets

FUEL FEED PORT SEALING APPARATUS

BACKGROUND OF THE INVENTION

The present invention relates to a fuel feed port sealing apparatus disposed at a vehicle or the like.

Conventionally, a motor vehicle or the like is provided at the fuel feed port thereof with a sealing apparatus in order to prevent fuel vapor from leaking from the gap between a fuel feed nozzle inserted into the fuel feed port and the inner periphery thereof.

An example of such a sealing apparatus is disclosed in Japanese Utility Model Laid-Open Publication No. 62-191631. As shown in FIG. 17, the sealing apparatus disclosed in this Publication is arranged such that an annular sealing member 92 made of rubber is fitted to the inner periphery of a fuel feed port 91, and that a metallic insertion guide 93 extends along that surface of the sealing member 92 which faces a fuel feed port opening side A1, the insertion guide 93 being disposed for guiding a metallic fuel feed nozzle N inserted into the fuel feed port 91, to the inner periphery of the sealing member 92. In this sealing apparatus, the sealing member 92 has an inner diameter smaller than the outer diameter of the fuel feed nozzle N to provide a tightening allowance. This causes the inner periphery of the sealing member 92 to stick fast to the outer periphery of the fuel feed nozzle N inserted into the fuel feed port 91.

In this fuel feed port sealing apparatus of prior art, each time the fuel feed nozzle N is inserted into the fuel feed port 91 or the fuel feed nozzle N thus inserted is removed therefrom, the outer periphery of the fuel nozzle N comes in sliding contact with the inner periphery of the sealing member 92. Accordingly, if the fuel feed nozzle N has got a wound at the outer periphery thereof, the wound acts as a sharp cutting face to damage the inner peripheral surface of the sealing member 92. This disadvantageously lowers the sealing properties of the sealing member 92. Further, there is the likelihood that the wound of the fuel feed nozzle N scraps off the inner peripheral surface of the sealing member 92 and that a fine piece thus scraped off enters into the fuel tank, resulting in early clogging of the fuel filter attached to the combustion device of an internal combustion engine or the like.

OBJECT AND SUMMARY OF THE INVENTION

It is an object of the present invention to provide a fuel feed port sealing apparatus which prevents a sealing member from coming in sliding contact with a fuel feed nozzle to prevent the sealing member from being lowered in sealing properties and also to prevent the fuel filter from getting clogged in the early stages.

A fuel feed port sealing apparatus of the present invention comprises: a sealing member made of an elastic material for hermetically sealing the gap between the inner periphery of a fuel feed port and the outer periphery of a fuel feed nozzle inserted thereinto; and an insertion guide for aligning the fuel feed nozzle inserted into the fuel feed port with respect to the sealing member, the sealing member comprising: an outer periphery sealing portion arranged to stick fast to the inner periphery of the fuel feed port; and an inner periphery sealing portion to be moved toward the fuel feed port inner side according to the insertion of the fuel feed nozzle and to be moved toward the fuel feed port opening side according to the removal of the fuel feed nozzle, the inner periphery sealing portion being arranged such that, as moved toward the fuel feed port opening side, the inner periphery sealing portion is increased in inner diameter at its part into which the fuel feed nozzle is inserted, the inner diameter thus increased being greater than the outer diameter of the fuel feed nozzle, and that this part is reduced in inner diameter with the movement of the inner periphery sealing portion toward the fuel feed port inner side, causing this part to stick fast to the outer periphery of the fuel feed nozzle (Claim 1).

According to this fuel feed port sealing apparatus, when the fuel feed nozzle is inserted into the fuel feed port, the fuel feed nozzle is inserted, as guided by the insertion guide, into the sealing member at its inner periphery sealing portion of which inner diameter is maintained as increased. When the fuel feed nozzle is further inserted toward the fuel feed port inner side, the inner periphery sealing portion of the sealing member can be moved, in company with the movement of the fuel feed nozzle, toward the fuel feed port inner side. Accordingly, as reduced in inner diameter, the inner periphery sealing portion of the sealing member can stick fast to the outer periphery of the fuel feed nozzle. When with the inner periphery sealing portion of the sealing member sticking fast to the outer periphery of the fuel feed nozzle, the fuel feed nozzle is moved toward the fuel feed port opening side for removing the fuel feed nozzle from the fuel feed port, the inner periphery sealing portion of the sealing member is moved, in company with the movement of the fuel feed nozzle, toward the fuel feed port opening side such that the inner periphery sealing portion can be increased in inner diameter at its part into which the fuel feed nozzle is inserted, the inner diameter thus increased being greater than the outer diameter of the fuel feed nozzle. With the inner periphery sealing portion thus increased in inner diameter, the fuel feed nozzle can be removed from the inner periphery sealing portion of the sealing member.

As discussed in the foregoing, the sealing apparatus is arranged such that the inner periphery sealing portion of the sealing member can be maintained as increased in inner diameter when inserting or removing the fuel feed nozzle into or from the inner periphery sealing portion. This prevents the inner periphery sealing portion from coming in sliding contact with the outer periphery of the fuel feed nozzle at the time of insertion and removal of the fuel feed nozzle. This prevents the sealing member from being damaged due to the sliding contact therebetween. This not only prevents the sealing member from being lowered in sealing properties, but also prevents the fuel filter from getting clogged in the early stages.

According to a preferred mode of the present invention, the fuel feed port sealing apparatus is arranged such that the inner periphery sealing portion of the sealing member has a tube portion to stick fast to the outer periphery of the fuel feed nozzle, this tube portion is provided at its end at the fuel feed port inner side with a metallic receiving member on which the tip of the fuel feed nozzle abuts, and the receiving member is biased toward the fuel feed port opening side by a spring (Claim 2). According to this mode, the fuel feed nozzle inserted into the tube portion of the inner periphery sealing portion can resiliently be received by the spring through the receiving member. This prevents the tube portion from being suddenly and excessively extended in the axial direction due to the inertia of the fuel feed nozzle inserted into the fuel feed port. This prevents the tube portion from being deteriorated in the early stages. Further, the tip of the fuel feed nozzle comes into collision with the receiving member. This prevents the tube portion from being damaged due to the direct collision of the tip of the fuel feed nozzle with the tube portion.

The fuel feed port sealing apparatus according to Claim 2 preferably comprises a stopper for regulating the inner periphery sealing portion of the sealing member from being moved, with the insertion of the fuel feed nozzle, by a predetermined amount or more toward the fuel feed port inner side (Claim 3). According to the arrangement above-mentioned, the stopper can regulate the inner periphery sealing portion of the sealing member from moving, with the insertion of the fuel feed nozzle, by a predetermined amount or more toward the fuel feed port inner side. This prevents the inner periphery sealing portion from being abnormally deformed due to the excessive movement of the inner periphery sealing portion toward the fuel feed port inner side. This assures the sealing properties of the sealing member in a stable manner for a long period of time.

Preferably, the stopper is disposed movably toward the fuel feed port inner side as biased toward the fuel feed port opening side by a spring, and in company with the movement of the stopper, the inner periphery sealing portion of the sealing member is moved with its shape maintained at the shape formed at the time when it has stuck fast to the fuel feed nozzle (Claim 4). According to the arrangement above-mentioned, the stopper can be moved, with the insertion of the fuel feed nozzle, toward the fuel feed port inner side against the biasing force of the stopper. This not only relaxes the shock generated at the time when the fuel feed nozzle comes into collision with the stopper through the receiving member, but also gives a degree of freedom to the insertion amount of the fuel feed nozzle. Thus, the fuel feed operation can be executed with no feeling of physical disorder. Further, in company with the movement of the stopper, the inner periphery sealing portion of the sealing member is moved with its shape maintained at the shape formed at the time when it has stuck fast to the fuel feed nozzle. Accordingly, even though the fuel feed nozzle is inserted deep into the fuel feed port, it is possible to prevent the inner periphery sealing portion from being abnormally deformed. This assures the sealing properties of the sealing member in a stable manner for a long period of time.

The fuel feed port sealing apparatus according to Claim 4 may be arranged such that the outer periphery sealing portion has a tube portion opposite to the inner periphery of the fuel feed port, and that the tube portion terminates at the inner periphery sealing portion with the tube portion turned back from its end at the fuel feed port opening side toward the fuel feed port inner side (Claim 5). According to the arrangement above-mentioned, when the inner periphery sealing portion of the sealing member is moved in company with the movement of the stopper, the outer periphery sealing portion can follow the movement of the inner periphery sealing portion while gradually changing the turning-back length of the tube portion of the outer periphery sealing portion. This readily and securely assures the sealing properties of the outer periphery sealing portion.

According to another preferred mode of the present invention, the fuel feed port sealing apparatus is arranged such that the inner periphery sealing portion has (i) an inner tube portion to stick fast to the outer periphery of the fuel feed nozzle, and (ii) a tapered tube portion extending radially outwardly of the inner tube portion with its diameter gradually increased toward the fuel feed port inner side (Claim 6). According to the mode above-mentioned, when the inner periphery sealing portion of the sealing member is moved, in company with the movement of the fuel feed nozzle, toward the fuel feed port inner side, the tapered tube portion can gradually be raised with respect to the axis thereof to reduce the inner tube portion in diameter. When the inner periphery sealing portion is moved, in company with the movement of the fuel feed nozzle, toward the fuel feed port opening side, the tapered tube portion can gradually be thrown down with respect to the axis thereof to increase the inner tube portion in diameter. Thus, the inner tube portion can securely be increased and reduced in diameter with a simple arrangement.

Preferably, the inner tube portion is provided at or in the peripheral surface thereof with a thinner portion or a through-hole to facilitate an increase or reduction in diameter of the inner tube portion (Claim 7). According to the arrangement above-mentioned, while assuring the properties of maintaining the shape of the inner tube portion, the thinner portion or through-hole enables the inner tube portion to be readily reduced or increased in diameter according to the insertion and removal of the fuel feed nozzle.

According to a further preferred mode of the present invention, the fuel feed port sealing apparatus is arranged such that the inner periphery sealing portion is formed by a tube body provided on the outer periphery thereof with an inclined surface gradually increased in diameter toward the fuel feed port opening side, and that an annular portion extends along the outer periphery of the inner periphery sealing portion, the annular portion being arranged to come in sliding contact with the inclined surface to reduce the inner periphery sealing portion in diameter when the inner periphery sealing portion is moved toward the fuel feed port inner side (Claim 8). According to the mode above-mentioned, when the inner periphery sealing portion is moved, in company with the movement of the fuel feed nozzle, toward the fuel feed port inner side, the inclined surface can come in sliding contact with the annular portion to reduce the inner periphery sealing portion in diameter. When the inner periphery sealing portion is moved, in company with the movement of the fuel feed nozzle, toward the fuel feed port opening side, the inclined surface can gradually be separated from the annular portion to increase the inner periphery sealing portion in diameter. Thus, the inner periphery sealing portion can be reduced and increased in diameter without the sealing member complicated in structure.

Preferably, a sliding contact ring of which diameter can be reduced, extends along the inclined surface of the inner periphery sealing portion, the sliding contact ring having wear resisting properties (Claim 9). According to the arrangement above-mentioned, the inner periphery sealing portion can be reduced and increased in diameter by causing the sliding contact ring to come into sliding contact with the annular portion. This prevents the inclined surface from being worn due to the direct sliding contact of the inclined surface with the annular portion.

According to still another preferred mode of the present invention, the fuel feed port sealing apparatus further comprises a cam mechanism arranged such that according to the insertion of the fuel feed nozzle into the inner periphery sealing portion, a cam member connected to the inner periphery sealing portion of the sealing member is forwardly rotated, while being moved toward the fuel feed port inner side, in the peripheral direction of the sealing member, thereby to twist the inner periphery sealing portion in the peripheral direction to reduce the diameter thereof, and that according to the removal of the fuel feed nozzle from the inner periphery sealing portion, the cam member is reversely rotated, while being moved toward the fuel feed port opening side, in the peripheral direction of the sealing member, thereby to untwist the inner periphery sealing portion to increase the diameter thereof (Claim 10). According to the mode above-mentioned, the cam mechanism is arranged such that with the insertion of the fuel feed nozzle into the fuel feed port, the cam member can forwardly be rotated in the peripheral direction of the sealing member while the cam member is moved toward the fuel feed port inner side. Consequently, the inner periphery sealing portion is twisted in the peripheral direction to reduce the diameter thereof, causing the inner periphery sealing portion to stick fast to the outer periphery of the fuel feed nozzle. Thus, the sealing properties can be enhanced. When with the inner periphery sealing portion of the sealing member sticking fast to the outer periphery of the fuel feed nozzle, the fuel feed nozzle is moved toward the fuel feed port opening side for removing the fuel feed nozzle from the fuel feed port, the cam member can reversely be rotated in the peripheral direction of the sealing member while being moved toward the fuel feed port opening side. This enables the inner periphery sealing portion to be untwisted to increase the inner diameter thereof such that the inner diameter is greater than the outer diameter of the fuel feed nozzle. With the inner periphery sealing portion thus increased in inner diameter, the fuel feed nozzle can be removed from the inner periphery sealing portion of the sealing member.

Preferably, the cam mechanism has a tube body which is disposed as aligned with the inner periphery sealing portion of the sealing member and which is provided in the peripheral surface thereof with a groove into which the cam member is introduced (Claim 11). According to the arrangement above-mentioned, the cam mechanism is simple in structure.

According to a still further preferred mode of the present invention, the fuel feed port sealing apparatus is arranged such that the inner periphery sealing portion of the sealing member has a tube portion which sticks fast to the outer periphery of the fuel feed nozzle, that the tube portion is provided at the end thereof at the fuel feed port inner side with a metallic receiving member on which the tip of the fuel feed nozzle abuts, that the receiving member is biased toward the fuel feed port opening side by a spring, and that the cam member is connected, through the receiving member, to the tube portion of the inner periphery sealing portion (Claim 12). According to the mode above-mentioned, the fuel feed nozzle inserted into the tube portion of the inner periphery sealing portion can resiliently be received by the spring through the receiving member. This prevents the tube portion from suddenly and excessively expanding due to the inertia of the fuel feed nozzle inserted into the fuel feed port. This consequently prevents the tube portion from being deteriorated in the early stages. Further, the tip of the fuel feed nozzle comes into collision with the receiving member. This prevents the tube portion from being damaged due to the direct collision of the tip of the fuel feed nozzle with the tube portion. Further, the cam member can readily and securely be connected to the tube portion of the inner periphery sealing portion.

The cam member is preferably a cam pin (Claim 13). In this case, the cam mechanism is further simplified in structure.

DETAILED DESCRIPTION OF THE PREFERRED EMBODIMENT

The following description will discuss in detail the present invention with reference to attached drawings illustrating preferred embodiments thereof.

Figure 1:
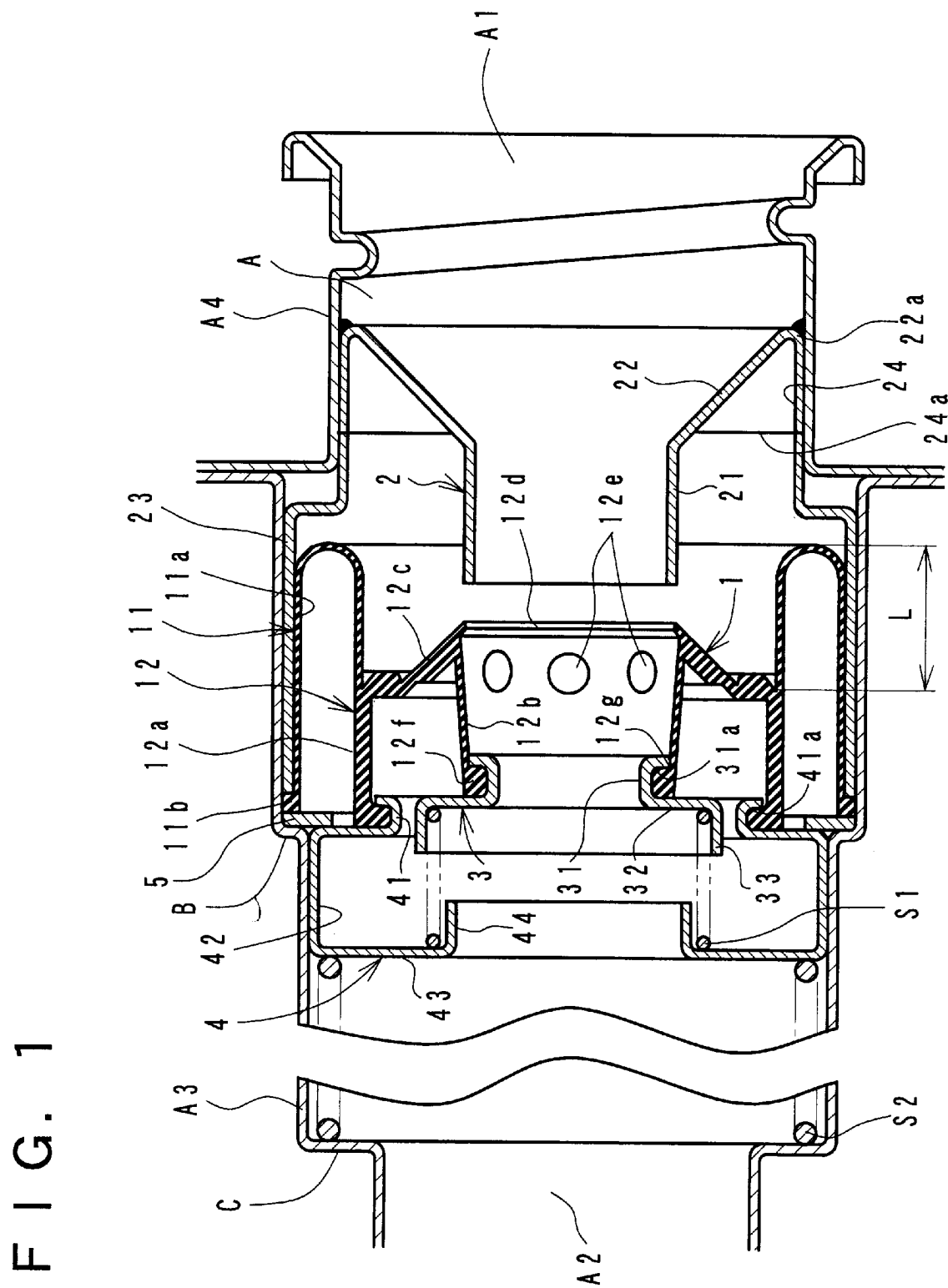
FIG. 1 is a section view of an embodiment of a fuel feed port sealing apparatus of the present invention.
Figure 2:
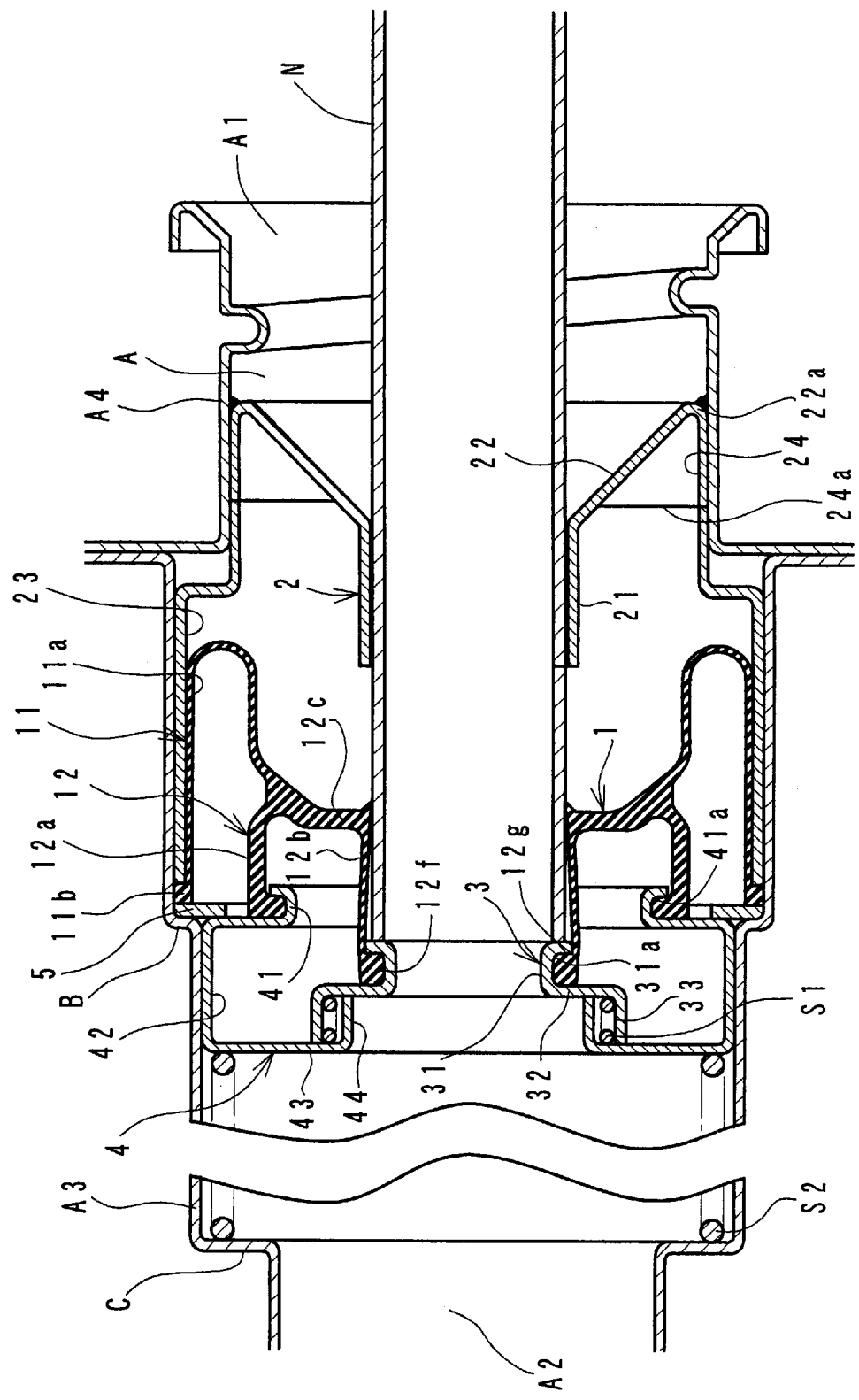
FIG. 2 is a section view of the sealing apparatus in FIG. 1, illustrating the state where the inner periphery of the sealing member sticks fast to the fuel feed nozzle.

FIG. 1 is a section view of a fuel feed port sealing apparatus of the present invention. This sealing apparatus has the main portion comprising: a sealing member 1 for hermetically sealing the gap between the inner periphery of a fuel feed port A and the outer periphery of a fuel feed nozzle N (See FIG. 2) inserted into the fuel feed port A; an insertion guide 2 for aligning the fuel feed nozzle N with the inner periphery of the sealing member 1 when inserting the fuel feed nozzle N into the fuel feed port A; a receiving member 3 on which the tip of the fuel feed nozzle N abuts when the same is inserted into the sealing member 1 along the inner periphery thereof; a first spring S1 for biasing the receiving member 3 toward a fuel feed port opening side A1; a stopper 4 disposed movably toward a fuel feed port inner side A2 for regulating the receiving member 3 from independently moving by a predetermined amount or more toward the fuel feed port inner side A2; and a second spring 2S for biasing the stopper 4 toward the fuel feed port opening side A1.

The fuel feed port A has axially serially disposed metallic tubes A3 and A4 each having a circular section, and is formed by fitting, to the inner periphery of the metallic tube A3, an outer tube portion 23 terminating at the insertion guide 2. This outer tube portion 23 terminating at the insertion guide 2, forms part of the inner periphery of the fuel feed port A.

The sealing member 1 has an outer periphery sealing portion 11 to stick fast to the inner periphery of the fuel feed port A, and an inner periphery sealing portion 12 axially movable in company with the insertion and removal of the fuel feed nozzle N. The whole sealing member 1 is made in a unitary structure of an elastic material such as rubber, synthetic resin or the like.

The outer periphery sealing portion 11 has a tube portion 11a which comes in contact with the inner periphery of the outer tube portion 23 of the insertion guide 2. The tube portion 11a is turned back from its end at the fuel feed port opening side A1 toward the fuel feed port inner side A2. Such a turned-back portion of the tube portion 11a terminates at an outer tube portion 12a of the inner periphery sealing portion 12.

The tube portion 11a is made thin such that its turning-back length L can gradually be changed according to the axial reciprocal movement of the inner periphery sealing portion 12. Thus, while following the movement of the inner periphery sealing portion 12, the outer periphery sealing portion 11 can readily and securely provide hermetic sealing properties with respect to the inner periphery of the fuel feed port A. However, the end portion 11b of the tube portion 11a at the fuel feed port inner side A2 is made thick. Accordingly, the end portion 11b comes in contact, in a good hermetic sealing manner, with the inner periphery of the metallic tube A3 forming the fuel feed port A. As far as at least the end portion 11b sticks fast to the inner periphery of the fuel feed port A, other portion of the tube portion 11a may be separated from the inner periphery of the fuel feed port A.

The inner periphery sealing portion 12 has: the outer tube portion 12a at which one end of the outer periphery sealing portion 11 terminates; an inner tube portion 12b disposed inside of the outer tube portion 12a; and a tapered tube portion 12c which projects from the end of the inner tube portion 12b at the fuel feed port opening side A1, toward the outer tube portion 12a, and of which outer peripheral portion terminates at the outer tube portion 12a.

The outer tube portion 12a is disposed as aligned with the fuel feed port A, and its end at the fuel feed port inner side A2 is engaged with the stopper 4. The whole outer tube portion 12a is made thick such that the shape thereof can be maintained.

With a predetermined distance provided between the outer tube portion 12a and the inner tube portion 12b, the inner tube portion 12b is disposed as aligned with the fuel feed port A. The inner tube portion 12b is provided at the end thereof at the fuel feed port inner side A2 with an annular flange 12f for engaging the inner tube portion 12b with the receiving member 3. It is the inner tube portion 12b that the fuel feed nozzle N is to be inserted in. The inner tube portion 12b is gradually increased in inner diameter toward the fuel feed port opening side A1. The inner tube portion 12b is provided, at the inner periphery of the end thereof at the fuel feed port opening side A1, with an annular lip portion 12d which is to stick fast, with the diameter thereof reduced, to the outer periphery of the fuel feed nozzle N. Provision is made such that, in the state shown in FIG. 1, the inner diameter of the inner tube portion 12b except for the flange 12f is minimized in the vicinity of a basal part 12g of the flange 12f and that this minimum inner diameter is greater by several mm than the outer diameter of the fuel feed nozzle N. The inner tube portion 12b is provided in the peripheral surface thereof with a plurality of through-holes 12e at regular intervals. The through-holes 12e are formed in order to readily and securely increase and reduce the diameter of the inner tube portion 12b, yet assuring the properties of maintaining the shape of the inner tube portion 12b in its entirety.

With gradually increased in diameter of the tapered tube portion 12c in the direction from the inner tube portion 12b of the inner periphery sealing portion 12 toward the fuel feed port inner side A2, the tapered tube portion 12c terminates at the inner periphery of the end of the outer tube portion 12a at the fuel feed port opening side A1. The tapered tube portion 12c is made thick to prevent the same from buckling when the inner periphery sealing portion 12 is moved toward the fuel feed port inner side A2. In FIG. 1, the outer periphery of the tapered tube portion 12c is turned, at its radial intermediate portion, in the direction at a right angle to the axis of the outer tube portion 12a. However, the outer periphery of the tapered tube portion 12c may be continuous, without turned, to the outer tube portion 12a.

The insertion guide 2 is formed by pressing a metallic thin plate. The insertion guide 2 comprises: a cylindrical portion 21 facing to the end surface of the inner tube portion 12b of the sealing member 1; a guide portion 22 extending in a flaring manner from the end of the cylindrical portion at the fuel feed port opening side A1 toward the fuel feed port opening side A1; and a short tube portion 24 extending from an end portion 22a of the guide portion 22 at the fuel feed port opening side A1 toward the fuel feed port inner side A2. The end portion 22a of the guide portion 22 at the fuel feed port opening side A1 is welded and secured to the metallic tube A4. With the short tube portion 24 fitted to the metallic tube A4, an opening end 24a of the short tube portion 24 comes in contact with the outer tube portion 23. The insertion guide 2 and the outer tube portion 23 are formed independently from each other, but can be made in a unitary structure by pressing a metallic thin plate.

The cylindrical portion 21 is disposed as aligned with the fuel feed port A and has an inner diameter which is smaller than the minimum inner diameter of the inner tube portion 12b except for the flange 12f and which is slightly greater than the outer diameter of the fuel feed nozzle N.

The receiving member 3 comprises: an engagement portion 31 having an annular engagement groove 31a with which the flange 12f of the inner periphery sealing portion 12 is engaged; an annular flat portion 32 on which one end surface of the first spring S1 abuts; and a short tube portion 33 extending from the outer periphery of the annular flat portion 32 toward the fuel feed port inner side A2. One end of the first spring S1 is introduced inside of the short tube portion 33. The receiving member 3 is formed by pressing a metallic thin plate.

The receiving member 3 is arranged such that, with the end surface of the engagement portion 31 at the fuel feed port opening side A1 receiving the fuel feed nozzle N inserted into the fuel feed port A, the inner tube portion 12b of the inner periphery sealing portion 12 is moved, in company with the movement of the fuel feed nozzle N, toward the fuel feed port inner side A2. At least one of the short tube portion 33 and the annular flat portion 32 is arranged to abut on the stopper 4 when the receiving member 3 is moved by a predetermined amount toward the fuel feed port inner side A2.

The stopper 4 comprises: an engagement portion 41 having an annular engagement groove 41a which is engaged with the end of the outer tube portion 12a of the inner periphery sealing portion 12; an outer tube portion 42 axially movably fitted to the inner periphery of the fuel feed port A; an annular flat portion 43 internally extending from the end of the outer tube portion 42 at the fuel feed port inner side A2; and an inner tube portion 44 extending from the inner periphery of the annular flat portion 43 toward the fuel feed port opening side A1. The other end of the first spring S1 is fitted, with a gap, to the outer periphery of the inner tube portion 44.

An annular engagement member 5 fitted to the inner periphery of the fuel feed port A regulates the stopper 4 from moving toward the fuel feed port opening side A1. A step portion B of the metallic tube A3 forming the fuel feed port A, regulates the engagement member 5 from moving toward the fuel feed port inner side A2. The outer tube portion 23 of the insertion guide 2 regulates the engagement member 5 from moving, together with the end portion 11b of the outer periphery sealing portion 11 at the fuel feed port inner side A2, toward the fuel feed port opening side A1.

The first spring S1 is formed by a helical compression spring. When the fuel feed nozzle N comes into collision with the receiving member 3, the first spring S1 is compressed to relax the shock generated at this time. Further, when the inner periphery sealing portion 12 of the sealing member 1 is once moved, in company with the movement of the fuel feed nozzle N, toward the fuel feed port inner side A2 and the fuel feed nozzle N is then removed from the fuel feed port A, the first spring S1 positively pushes, according to the removal of the fuel feed nozzle N, the inner periphery sealing portion 12 back toward the fuel feed port opening side A1. In FIG. 1, the first spring S1 is stretched substantially at a free length such that the inner periphery sealing portion 12 of the sealing member 1 can be maintained substantially in a free state.

The second spring 2S is formed by a helical compression spring. The second spring 2S is interposed, as resiliently compressed by a predetermined amount, between a step portion C of the metallic tube A3 forming the fuel feed port A and the annular flat portion 43 of the stopper 4. The biasing force of the second spring 2S is greater than that of the first spring S1 such that, when the receiving member 3 as pushed by the fuel feed nozzle N comes into collision with the stopper 4, the second spring 2S starts being resiliently compressed.

According to the arrangement above-mentioned, the fuel feed nozzle N inserted into the fuel feed port A is introduced, as guided by the insertion guide 2, into the inner tube portion 12b of the sealing member 1, and the tip of the fuel feed nozzle N comes into collision with the receiving member 3. The minimum inner diameter of the inner tube portion 12b except for the flange 12f is greater than the outer diameter of the fuel feed nozzle N. This prevents the inner tube portion 12b from coming in sliding contact with the outer periphery of the fuel feed nozzle N. Further, the fuel feed nozzle N inserted into the inner tube portion 12b can resiliently be received by the first spring S1 through the receiving member 3. This prevents the inner tube portion 12b from suddenly and excessively expanding in the axial direction due to the inertia of the fuel feed nozzle N inserted into the fuel feed port A. Consequently, this prevents the inner tube portion 12b from being deteriorated in the early stages. Further, the receiving member 3 prevents the tip of the fuel feed nozzle N from directly coming into collision with the flange 12f. This prevents he flange 12f from being damaged by the fuel feed nozzle N.

When the fuel feed nozzle N is further inserted from the state where the fuel feed nozzle N abuts on the receiving member 3, the receiving member 3 is moved in company with the movement of the fuel feed nozzle N against the biasing force of the first spring S1. Accordingly, the inner tube portion 12b of the sealing member 1 is moved toward the fuel feed port inner side A2 and the tapered tube portion 12c is gradually raised with respect to the axis thereof such that the inner periphery thereof is gradually reduced in diameter. Accordingly, the lip portion 12d of the inner tube portion 12b is also gradually reduced in diameter. When the receiving member 3 comes into collision with the stopper 4, the lip portion 12d sticks fast to the outer periphery of the fuel feed nozzle N. As a result, the gap between the inner periphery of the fuel feed port A and the outer periphery of the fuel feed nozzle N is hermetically sealed (See FIG. 2). At this point of time, the inner tube portion 12b of the sealing member 1 is regulated from being independently moved. This prevents the inner periphery sealing portion 12 from being abnormally deformed due to the independent excessive movement of the inner tube portion 12b.

Figure 3:
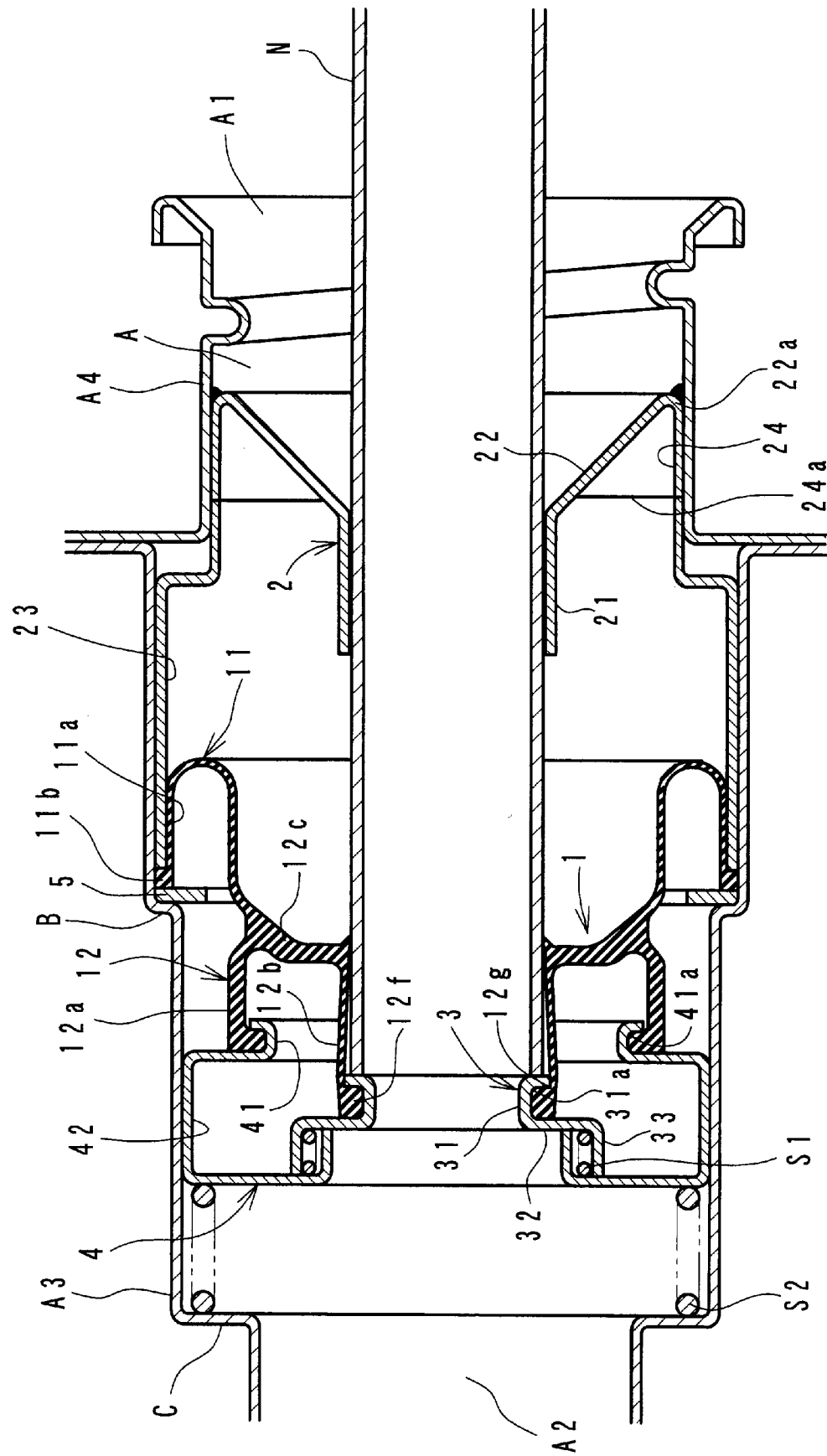
FIG. 3 is a section view of the sealing apparatus in FIG. 1, illustrating the state where the sealing member is moved from the state in FIG. 2 toward the fuel feed port inner side.

When the fuel feed nozzle N is further inserted with the receiving member 3 abutting on the stopper 4, the stopper 4 is moved toward the fuel feed port inner side A2 against the biasing force of the second spring 2S (See FIG. 3). Consequently, the inner periphery sealing portion 12 of the sealing member 1 is also moved toward the fuel feed port inner side A2. During this movement, the shape of the inner periphery sealing portion 12 is maintained at the shape thereof formed at the time when the receiving member 3 comes into collision with the stopper 4. This prevents the inner periphery sealing portion 12 from being abnormally deformed due to the deep insertion of the fuel feed nozzle N. Further, it is possible to relax the shock generated at the time when the fuel feed nozzle N comes into collision with the stopper 4 through the receiving member 3. Further, a degree of freedom can be provided for the insertion depth of the fuel feed nozzle N. It is therefore possible to execute a fuel feed operation with no feeling of physical disorder as compared with a conventional operation.

When fuel feeding is completed and the fuel feed nozzle N is moved toward the fuel feed port opening side A1 for removing the fuel feed nozzle N through the fuel feed port A, the stopper 4 is returned, while following the fuel feed nozzle N, to the original position by the biasing force of the second spring S2. Then, the receiving member 3 and the inner tube portion 12b of the sealing member 1 are moved toward the fuel feed port opening side A1 by the biasing force of the first spring S1. With such movement, the tapered tube portion 12c can gradually be thrown down with respect to the axis thereof. This gradually increases the diameter of the inner tube portion 12b of the sealing member 1. Ultimately, the lip portion 12d can be separated from the fuel feed nozzle N. Accordingly, the fuel feed nozzle N can be removed from the fuel feed port A without sliding contact with the inner tube portion 12b.

As discussed in the foregoing, the sealing apparatus is arranged such that, when inserting and removing the fuel feed nozzle N into and from the inner tube portion 12b of the inner periphery sealing portion 12, the inner tube portion 12b can be maintained at the state where the diameter thereof is increased. This prevents the outer periphery of the fuel feed nozzle N from coming in sliding contact with the inner tube portion 12b when inserting and removing the fuel feed nozzle N. This prevents the sealing member 1 from being damaged due to the sliding contact therebetween.

The sealing member 1 is arranged such that, at the axial movement thereof, the inner tube portion 12b is selectively increased or reduced in diameter by the tapered tube portion 12c of the inner periphery sealing portion 12. Accordingly, the inner tube portion 12b can readily and securely be increased and reduced in diameter using a simple arrangement.

Figure 4:
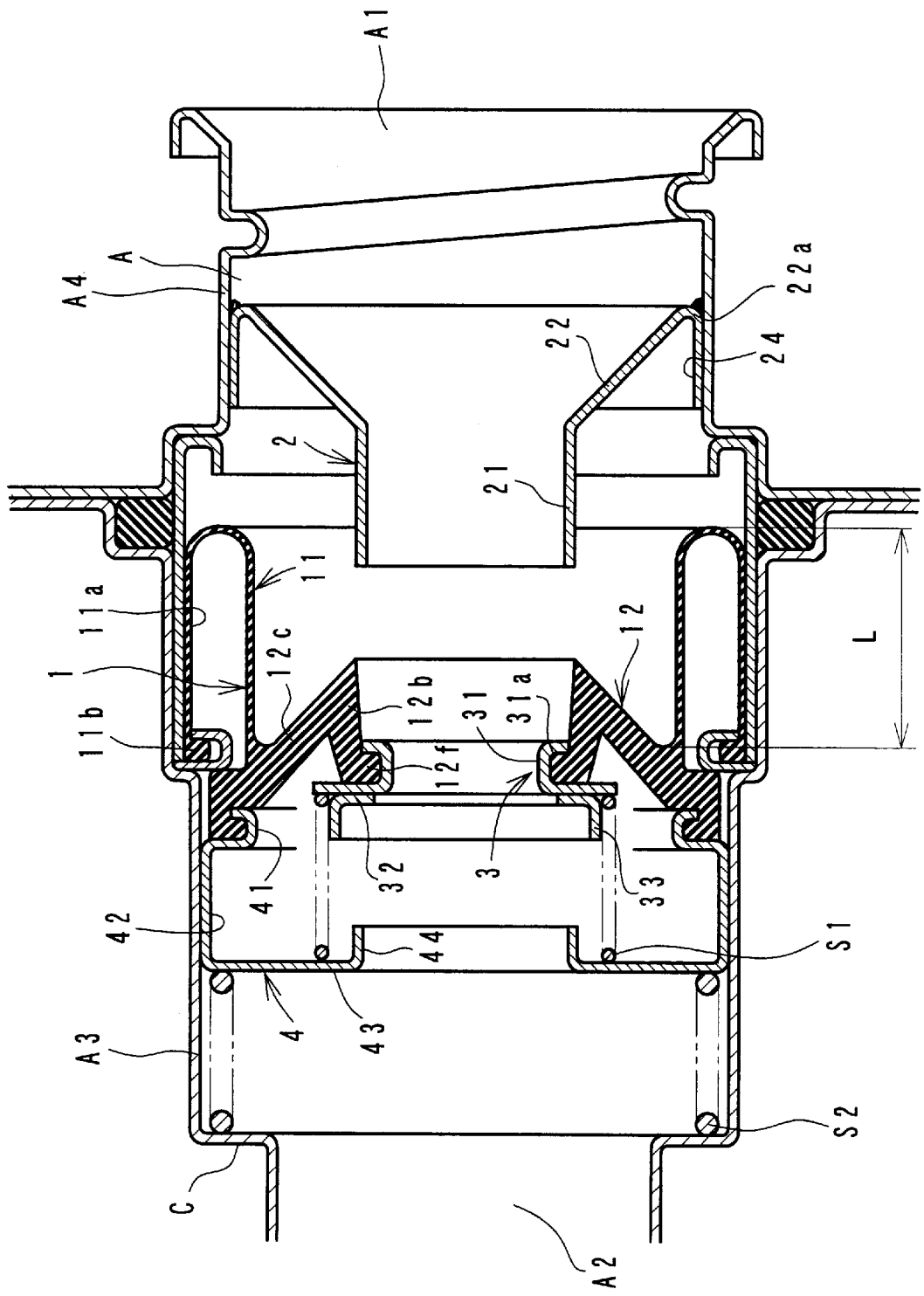
FIG. 4 is a section view of another embodiment of the present invention.

FIG. 4 is a section view of another embodiment of the present invention. In this embodiment, a sealing member 1 is not provided at its inner periphery sealing portion 12 with the outer tube portion 12a shown in FIG. 1, but the outer periphery of a tapered tube portion 12c is engaged directly with an engagement portion 41 of a stopper 4. A turning-back end of a tube portion 11a of the sealing member 1 terminates at the tapered tube portion 12c. Further, the tapered tube portion 12c is made thick in its entirety to maintain the whole shape of the inner periphery sealing portion 12. In this embodiment, the lip portion 12d of the inner tube portion 12b shown in FIG. 1 is not disposed.

Figure 5:
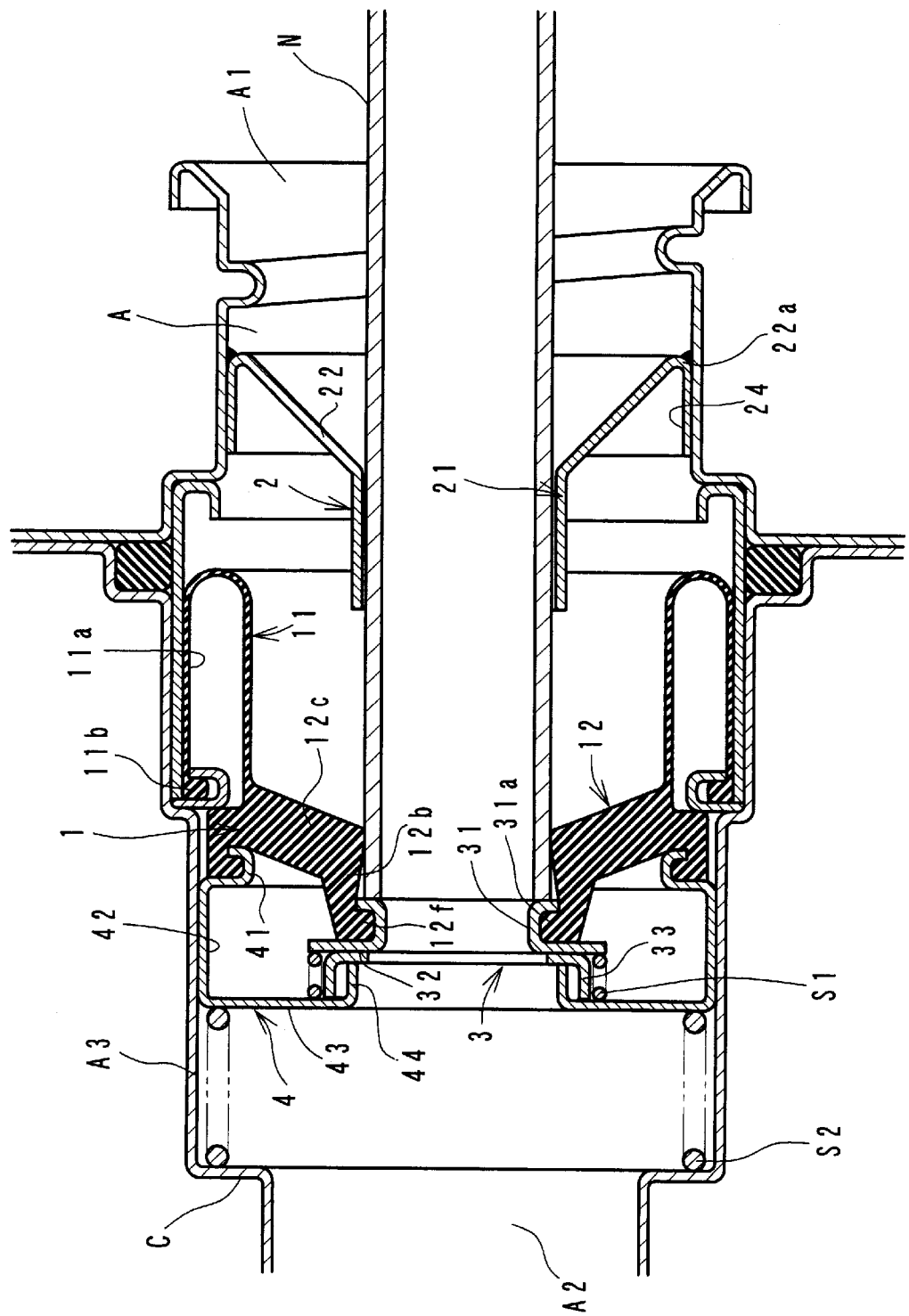
FIG. 5 is a section view of the sealing apparatus in FIG. 4, illustrating the state where the inner periphery of the sealing member sticks fast to the fuel feed nozzle.
Figure 6:
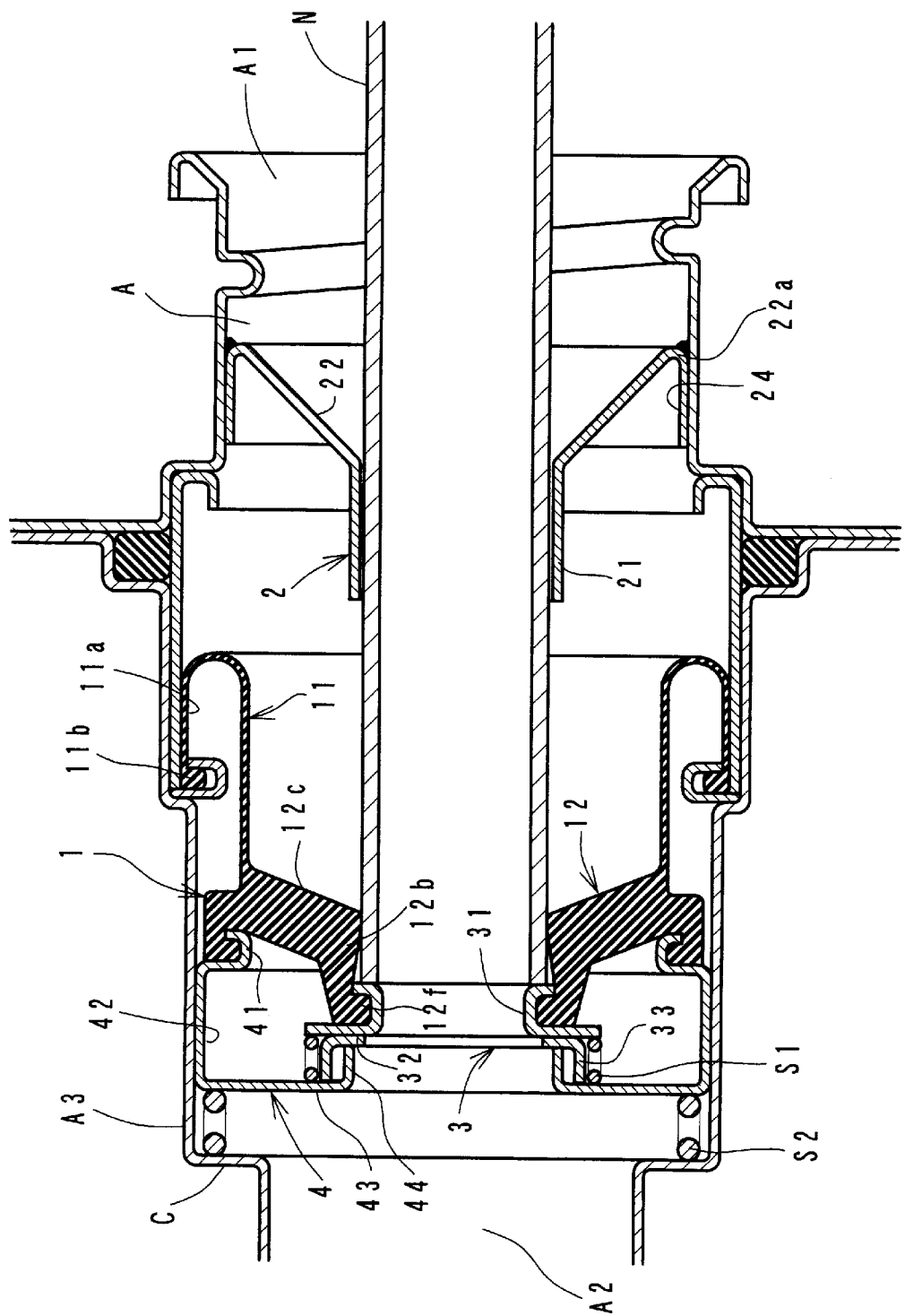
FIG. 6 is a section view of the sealing apparatus in FIG. 4, illustrating the state where the sealing member is moved from the state in FIG. 5 toward the fuel feed port inner side.

15 According to this embodiment, too, when the inner tube portion 12b is moved, while following a fuel feed nozzle N inserted into a fuel feed port A, toward a fuel feed port inner side A2, the tapered tube portion 12c reduces the inner tube portion 12b in diameter. This enables the inner periphery of the end of the inner tube portion 12b at a fuel feed port opening side A1 to stick fast to the outer periphery of the fuel feed nozzle N (See FIG. 5). When the fuel feed nozzle N is further inserted from the state above-mentioned, the inner tube portion 12b can be moved toward the fuel feed port inner side A2. During such movement of the inner tube portion 12b, the turning-back length L of the tube portion 11a of the outer periphery sealing portion 11 is gradually changed to assure the hermetic sealing properties thereof and the shape of the whole inner periphery sealing portion 12 is maintained at the shape formed at the time when the inner periphery sealing portion 12 has stuck fast to the outer periphery of the fuel feed nozzle N (See FIG. 6). Further, according to the removal of the fuel feed nozzle N, the inner tube portion 12b can be moved toward the fuel feed port opening side A1 to increase the diameter thereof. This prevents the inner tube portion 12b from coming in sliding contact with the outer periphery of the fuel feed nozzle N when inserting and removing the fuel feed nozzle N. Consequently, this prevents the sealing member 1 from being damaged due to the slide contact between the inner tube portion 12b and the fuel feed nozzle N.

Figure 7:
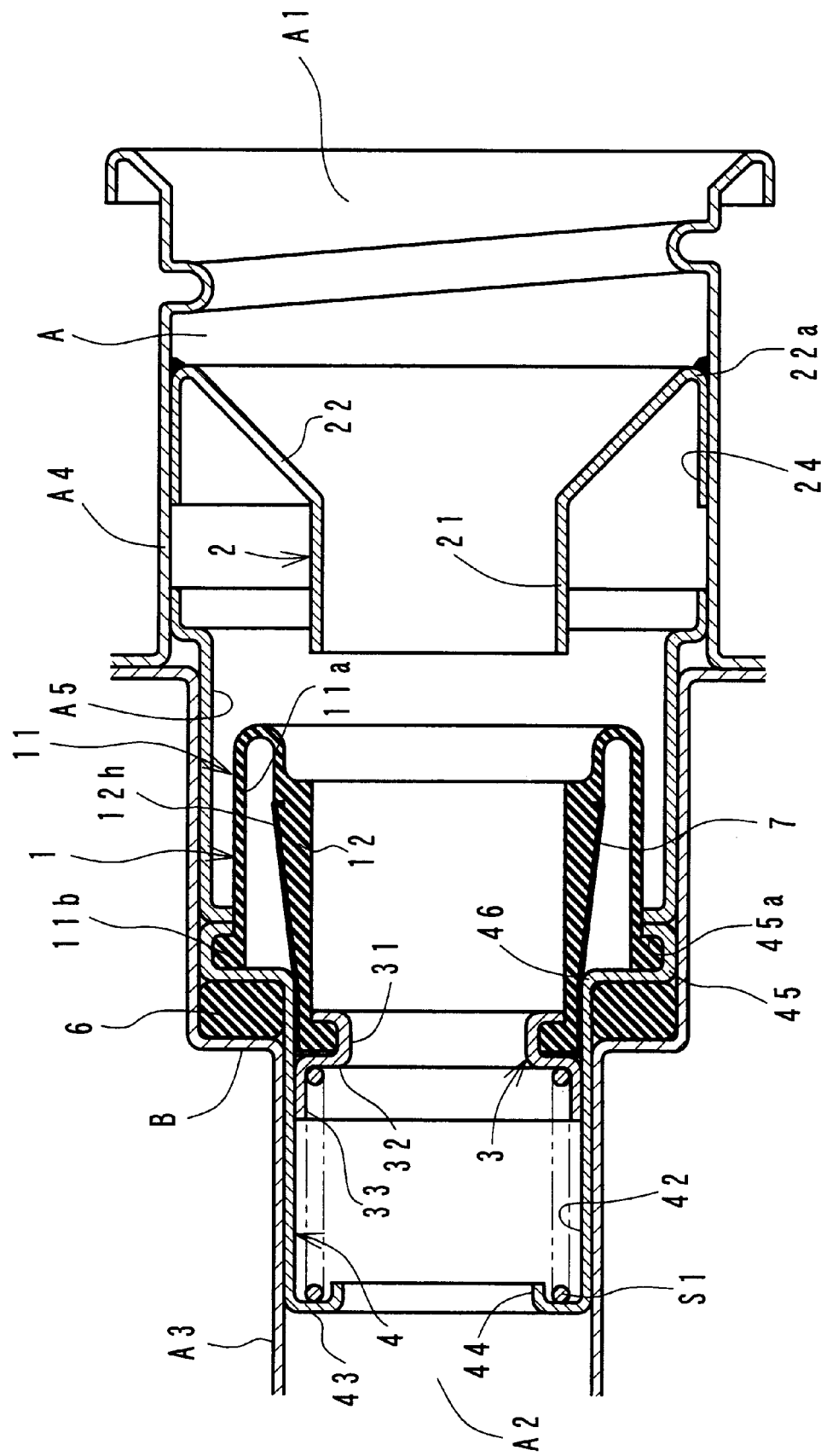
FIG. 7 is a section view of a further embodiment of the present invention.

FIG. 7 is a section view of a further embodiment of the present invention. According to this embodiment, an inner periphery sealing portion 12 of a sealing member 1 is formed by a single tube body and is provided on the outer periphery thereof with an inclined surface 12h of which diameter is gradually increased toward the fuel feed port opening side A1. The inner periphery of the inner periphery sealing portion 12 is formed by a circumferential surface parallel to the axis thereof and has an inner diameter slightly greater by about several mm than the outer diameter of the fuel feed nozzle N such that the inner periphery of the inner periphery sealing portion 12 does not come in sliding contact with the outer periphery of the fuel feed nozzle N when the fuel feed nozzle N is introduced.

A stopper 4 is provided, at the end of an outer tube portion 42 at the fuel feed port opening side A1, with an outwardly-oriented flange-like engagement portion 45 having an annular engagement groove 45a. The engagement groove 45a is engaged with an end portion 11b of an outer periphery sealing portion 11 of the sealing member 1, and a rubber seal 6 is disposed between the engagement portion 45 and a step portion B of a metallic tube A3 forming a fuel feed port A for hermetically sealing the gap therebetween.

The engagement portion 45 is interposed between the rubber seal 6 and an engagement tube portion A5 immovably fitted to the inner periphery of the fuel feed port A. This regulates the axial movement of the stopper 4. Accordingly, the second spring S2 for biasing the stopper 4 in the embodiment mentioned earlier is not disposed in this embodiment. A receiving member 3 is slidably fitted to the inner periphery of the outer tube portion 42 of the stopper 4, and the end of the inner periphery sealing portion 12 at the fuel feed port inner side A2 is introduced into the outer tube portion 42.

Figure 8:
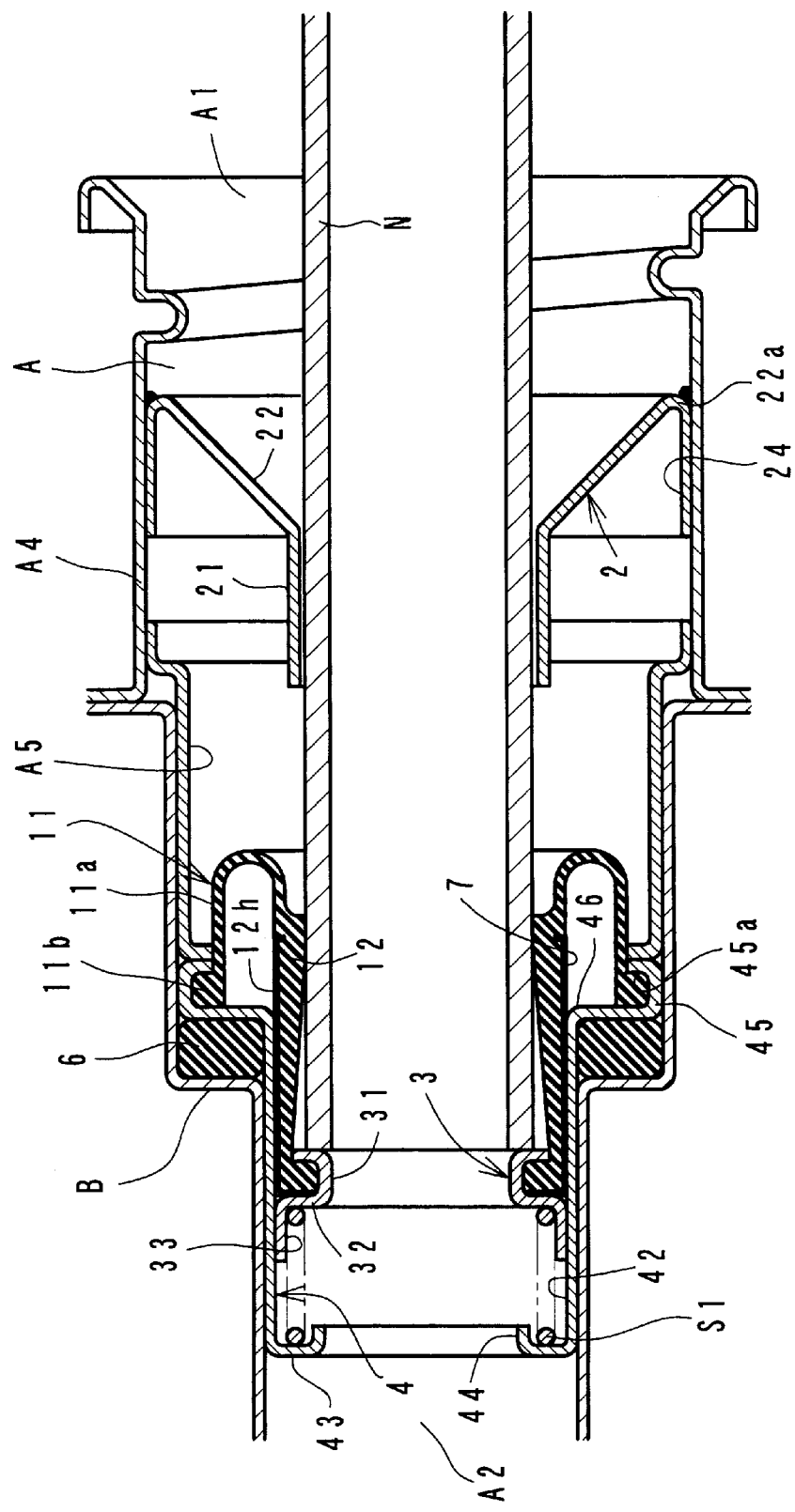
FIG. 8 is a section view of the sealing apparatus in FIG. 7, illustrating the state where the inner periphery of the sealing member sticks fast to the fuel feed nozzle.
Figure 9:
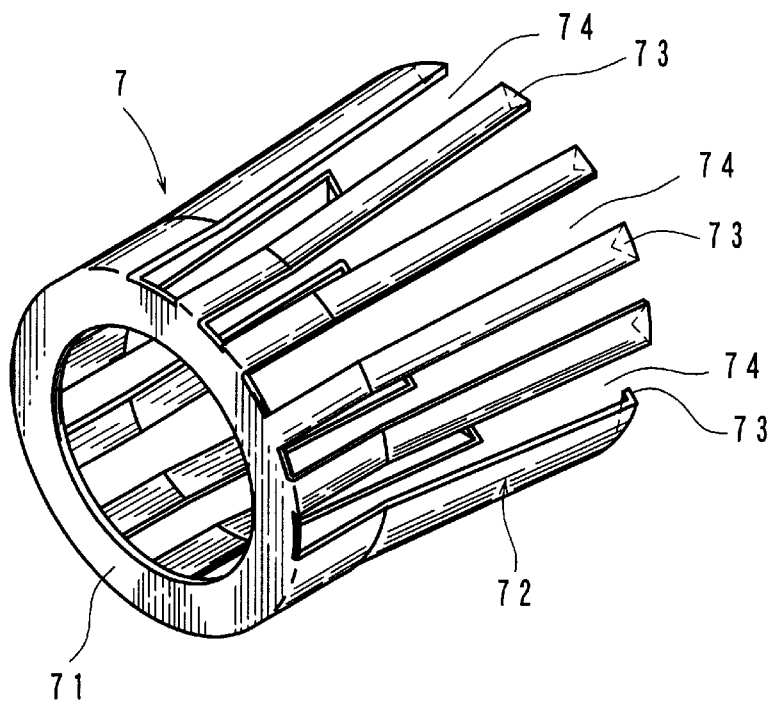
FIG. 9 is a perspective view of a sliding contact ring.

A sliding contact ring 7 made of metal having wear resistance is disposed on and extends along the outer periphery of the inner periphery sealing portion 12 of the sealing member 1. As shown in FIG. 9, the sliding contact ring 7 has a flat ring portion 71 extending along a flange 12f of the inner periphery sealing portion 12, and a sliding contact unit 72 extending from the outer periphery of the ring portion 71 toward the fuel feed port opening side A1 along the outer periphery of the inner periphery sealing portion 12. The sliding contact unit 72 is circumferentially divided into a plurality of portions at regular intervals by a plurality of axially extending slits 74 such that the sliding contact unit 72 can be reduced in diameter. Further, the sliding contact unit 72 may be provided at its tips with pawls 73 arranged to bite the inner periphery sealing portion 12. FIG. 7 and FIG. 8 show the arrangement in which the pawls 73 are disposed.

According to the sealing apparatus having the arrangement above-mentioned, when the fuel feed nozzle N is further inserted with the tip thereof abutting on the receiving member 3, the receiving member 3 is moved in company with the movement of the fuel feed nozzle N against the biasing force of the first spring S1, and the sliding contact ring 7 extending along the inner periphery sealing portion 12 of the sealing member 1, comes in sliding contact with an annular portion 46 formed by the end of the outer tube portion 42 at the fuel feed port opening side A1. This reduces the inner periphery sealing portion 12 in inner diameter such that the inner periphery of the end of the inner periphery sealing portion 12 at the fuel feed port opening side A1, sticks fast to the outer periphery of the fuel feed nozzle N (See FIG. 8).

When fuel feeding is completed and the fuel feed nozzle N is removed from the fuel feed port A, the biasing force of the first spring S1 causes the receiving member 3 and the inner periphery sealing portion 12 of the sealing member 1 to move, while following the fuel feed nozzle N, toward the fuel feed port opening side A1. This increases the inner periphery sealing portion 12 of the sealing member 1 in diameter, causing the same to be separated from the fuel feed nozzle N.

According to this sealing apparatus, too, the fuel feed nozzle N can be inserted and removed without sliding-contacting with the inner periphery sealing portion 12.

Further, using the annular portion 46 formed by the end of the stopper 4, the inner periphery sealing portion 12 can directly be reduced in inner diameter. This enables the inner periphery sealing portion 12 to be simplified in arrangement. Further, the metallic sliding contact ring 7 which can be reduced in diameter, extends along the inclined surface 12h of the inner periphery sealing portion 12. This prevents the inclined surface 12h from being worn due to the direct sliding contact between the inclined surface 12h and the annular portion 46.

Figure 10:
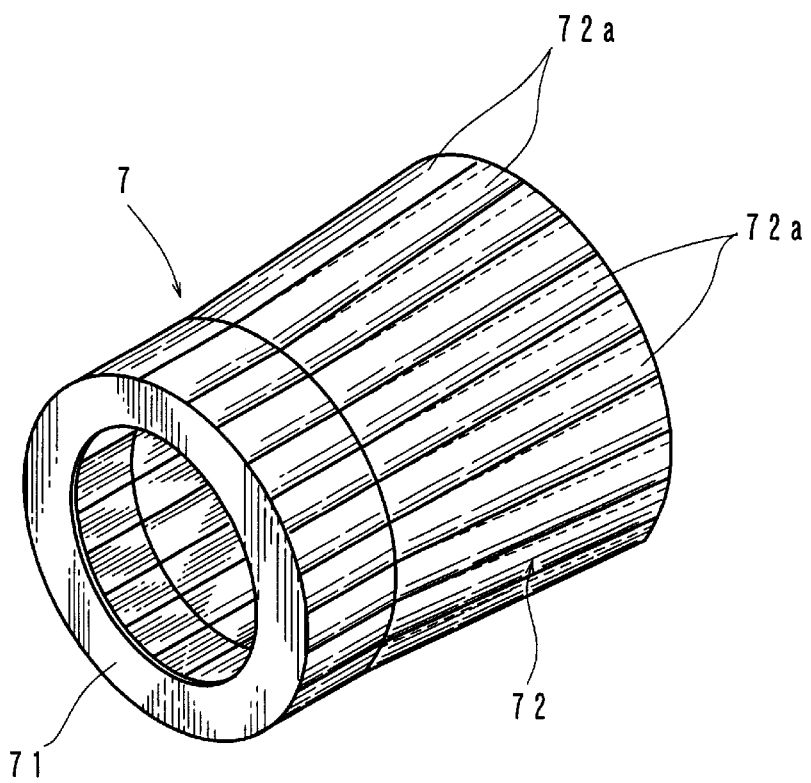
FIG. 10 is a perspective view of another embodiment of the sliding contact ring.

The sliding contact ring 7 may be arranged such that, as shown in FIG. 10, the sliding contact unit 72 is circumferentially cut into a plurality of cut pieces 72a at regular intervals and that the sliding contact unit 72 extends along the inclined surface 12h of the inner periphery sealing portion 12 with the cut-edge sides of the cut pieces 72a overlapping each other. Alternatively, the whole sliding contact ring 7 may be made of synthetic resin having wear resistance.

Figure 11:
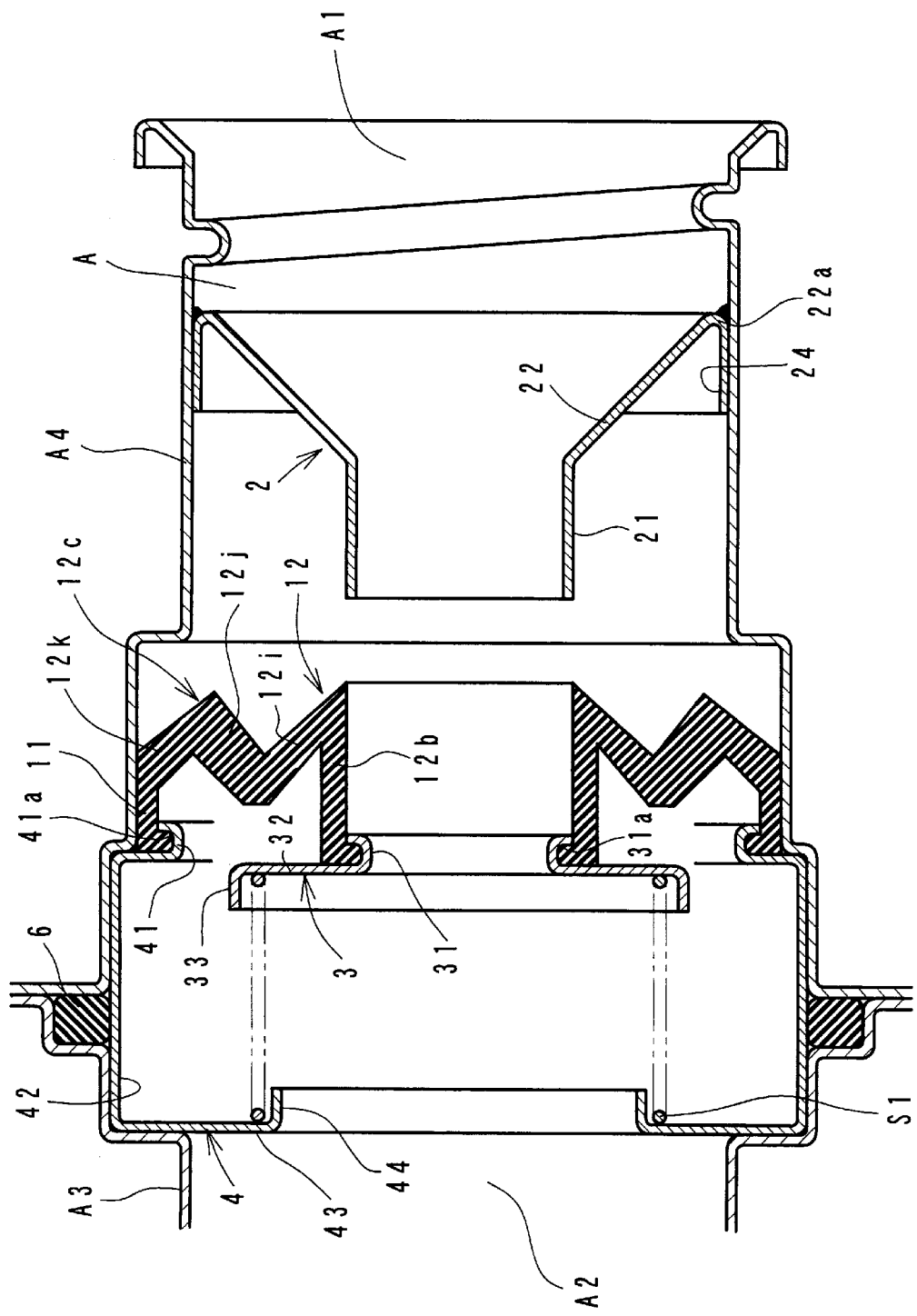
FIG. 11 is a section view of still another embodiment of the present invention.

FIG. 11 is a section view of still another embodiment of the sealing apparatus of the present invention. According to this embodiment, with its axial movement regulated, a stopper 4 is fitted to the inner periphery of a fuel feed port A, and an outer periphery sealing portion 11 of a sealing member 1 is formed by a thick cylindrical body and terminates at a tapered tube portion 12c of an inner periphery sealing portion 12 with no thin turning-back portion disposed at the outer periphery sealing portion 11. The tapered tube portion 12c is provided with: a first tapered portion 12i of which diameter is gradually increased from the end of an inner tube portion 12b at a fuel feed port opening side A1 toward a fuel feed port inner side A2; a second tapered portion 12j of which diameter is gradually increased from the outer periphery of the first tapered portion 12i toward the fuel feed port opening side A1; and a third tapered portion 12k of which diameter is gradually increased from the outer periphery of the second tapered portion 12j toward the fuel feed port inner side A2 and of which outer periphery terminates at the outer periphery sealing portion 11.

Figure 12:
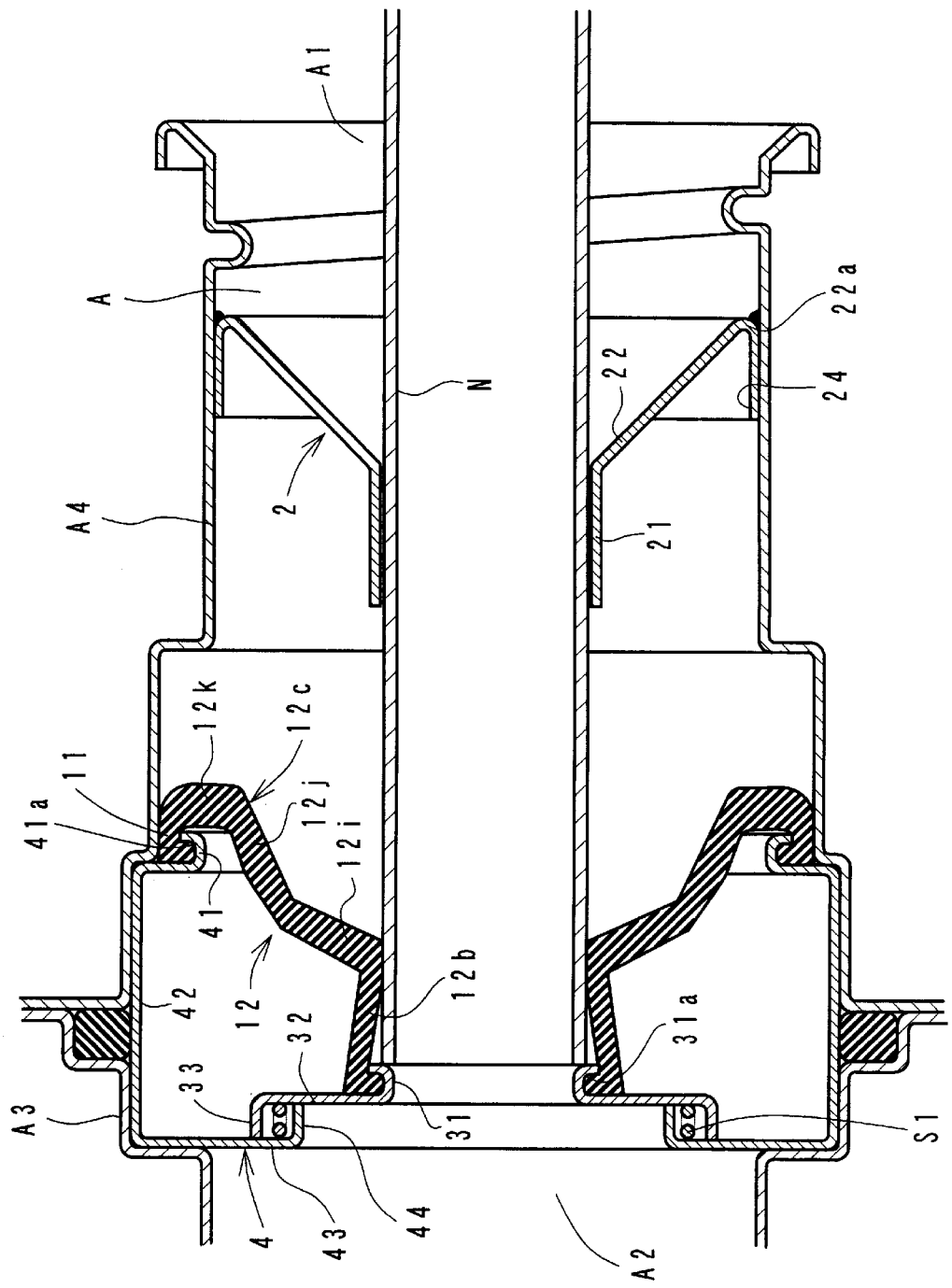
FIG. 12 is a section view of the sealing apparatus in FIG. 11, illustrating the state where the inner periphery of the sealing member sticks fast to the fuel feed nozzle.

According to the sealing apparatus having the arrangement above-mentioned, too, when the inner tube portion 12b is moved, while following the fuel feed nozzle N inserted into the fuel feed port A, toward the fuel feed port inner side A2, the tapered tube portion 12c causes the end of the inner tube portion 12b at the fuel feed port opening side A1 to be reduced in diameter. Thus, the end of the inner tube portion 12b can stick fast to the outer periphery of the fuel feed nozzle N. When the fuel feed nozzle N is further inserted, the inner tube portion 12b can be moved, while following the fuel feed nozzle N, toward the fuel feed port inner side A2 while the tapered tube portion 12c of the inner periphery sealing portion 12 is gradually expanded (See FIG. 12). Further, with the removal of the fuel feed nozzle N, the inner tube portion 12b can be moved toward the fuel feed port opening side A1 to increase the inner diameter thereof. This prevents the inner periphery of the inner tube portion 12b from coming in sliding contact with the outer periphery of the fuel feed nozzle N when inserting and removing the fuel feed nozzle N. Consequently, this prevents the sealing member 1 from being damaged due to the sliding contact between the inner tube portion 12b and the fuel feed nozzle N.

Figure 13:
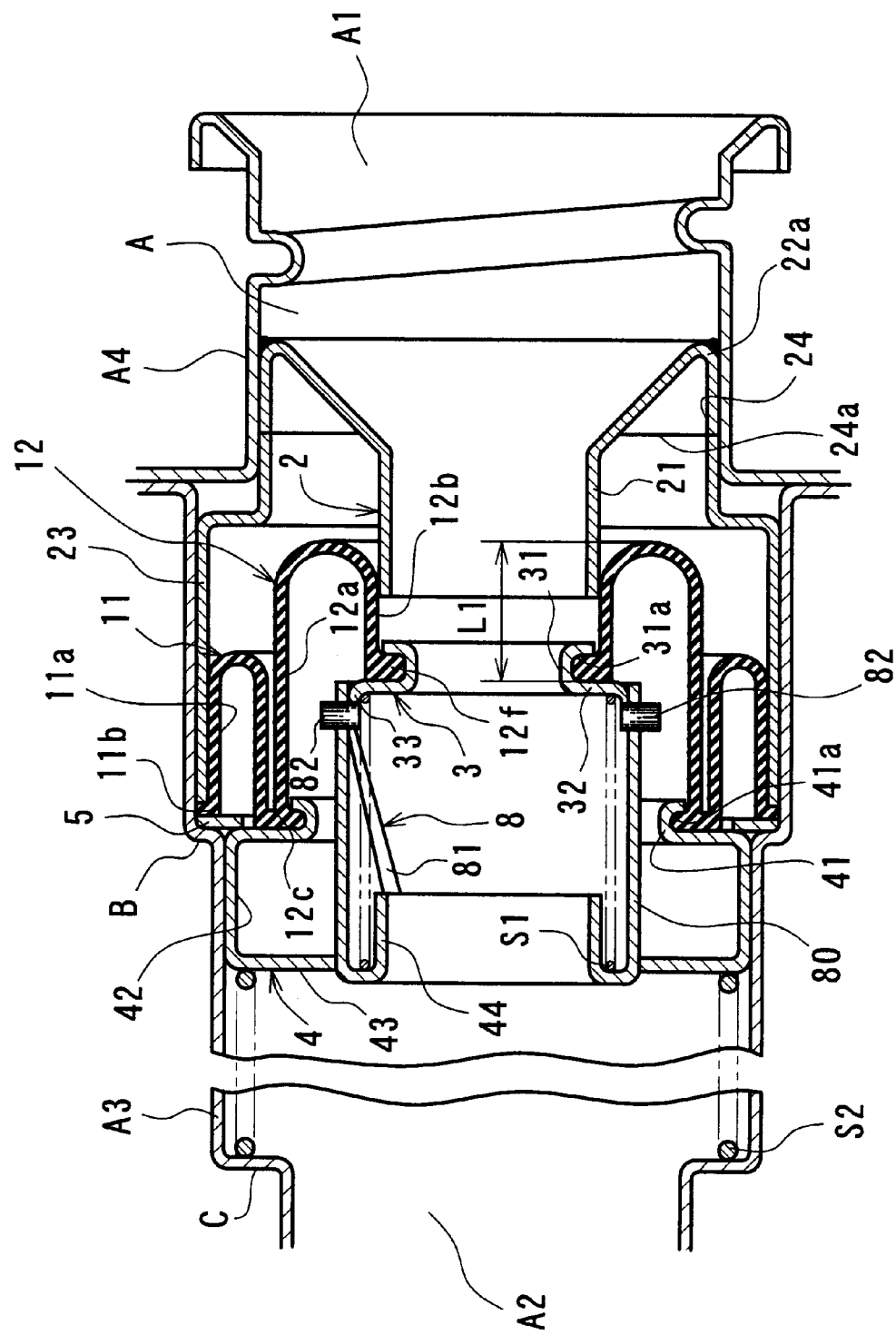
FIG. 13 is a still further embodiment of the present invention.

FIG. 13 is a section view of a still further embodiment of the present invention. In this embodiment, a tube portion 11a of an outer periphery sealing portion 11 terminates at an end portion 12c of an outer tube portion 12a of an inner periphery sealing portion 12 at a fuel feed port inner side A2. As turned back from its end at a fuel feed port opening side A1 toward the fuel feed port inner side A2, the outer tube portion 12a of the inner periphery sealing portion 12 terminates at the end of an inner tube portion 12b of the inner periphery sealing portion 12 at the fuel feed port opening side A1. Each of the outer tube portion 12a and the inner tube portion 12b is formed of a circumferential surface substantially parallel to the axis of the fuel feed port A. The inner diameter of the inner tube portion 12b is slightly greater by about several mm than the outer diameter of the fuel feed nozzle N. Thus, the inner periphery of the inner tube portion 12b does not come in sliding contact with the outer periphery of the fuel feed nozzle N when the fuel feed nozzle N is introduced into the inner tube portion 12b. The inner periphery sealing portion 12 is made thin such that its turning-back length L can gradually be changed according to the axial reciprocal movement of the inner tube portion 12b. The end portion 12c of the outer tube portion 12a at the fuel feed port inner side A2 is engaged with a stopper 4, and a flange 12f of the inner tube portion 12b at the fuel feed port inner side A2 is engaged with a receiving member 3.

Figure 14:
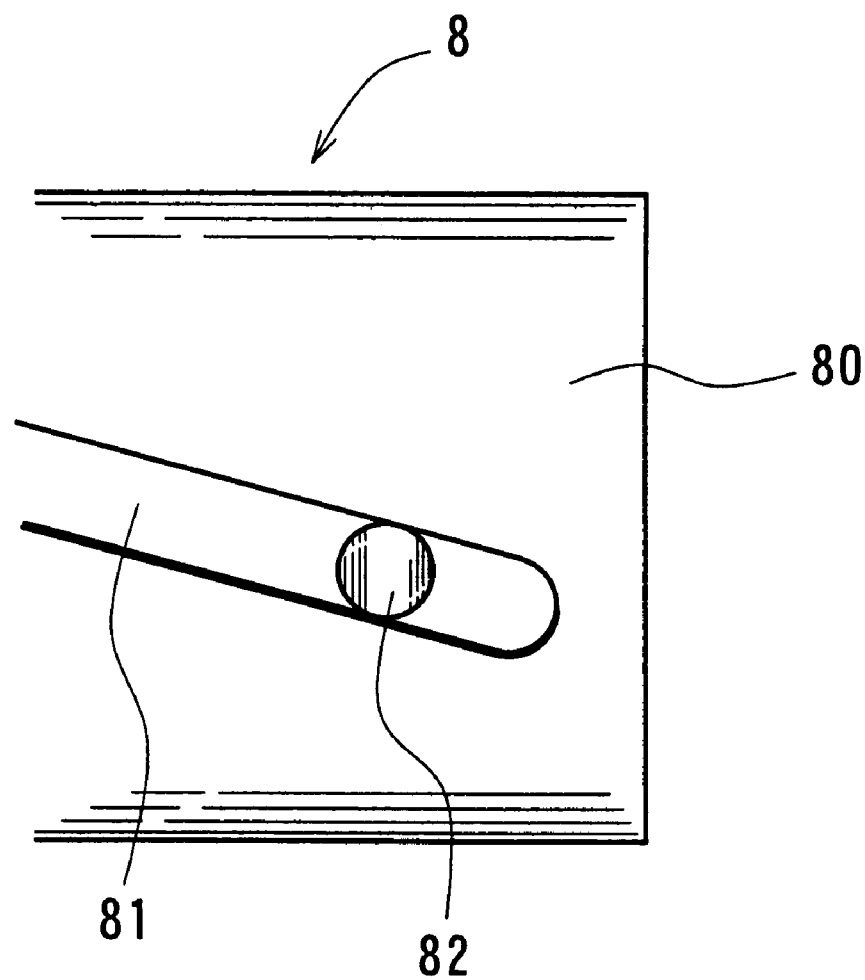
FIG. 14 is a plane view of a cam mechanism.

The stopper 4 has, outside of its inner tube portion 44, a tube body 80 extending toward the fuel feed port opening side A1. This tube body 80 is aligned with the inner periphery sealing portion 12, and the end of the tube body 80 at the fuel feed port opening side A1 surrounds the receiving member 3. The tube body 80 is provided at opposite positions on the peripheral surface thereof with spirally extending grooves 81 (See FIG. 14). Introduced into the grooves 81 are cam pins 82 serving as cam members. The axes of the cam pins 82 are at right angles to the axis of the tube body 80. The ends of the cam pins 82 located inside of the tube body 80 are secured to a short tube portion 33 of the receiving member 3. The tube body 80, the grooves 81 and the cam pins 82 form a cam mechanism 8. In FIG. 13, the cam pins 82 are disposed at two positions, but a single cam pin 82 may be used as far as the operation of cam pin can be achieved.

Figure 15:
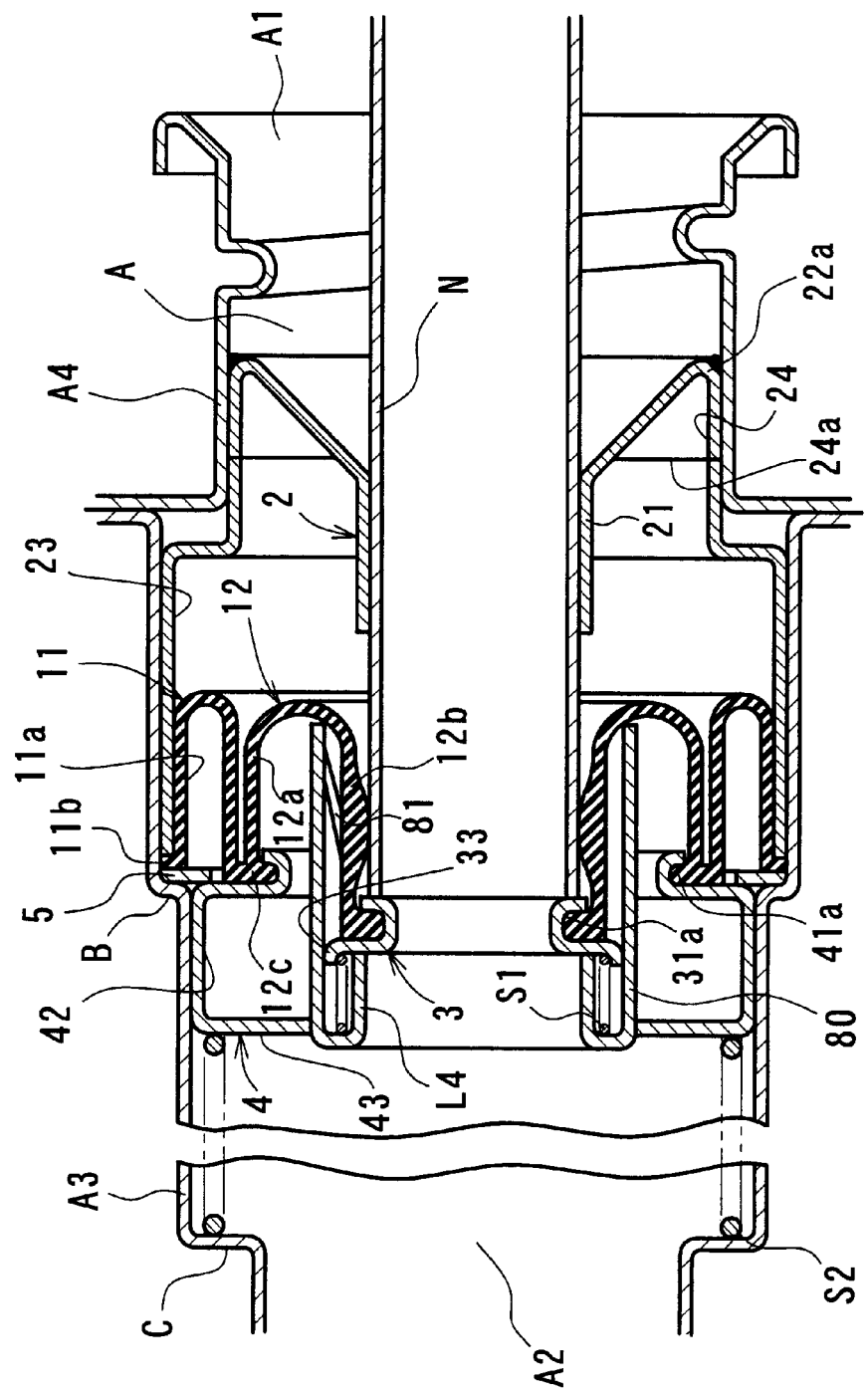
FIG. 15 is a section view of the sealing apparatus in FIG. 13, illustrating the state where the inner periphery of the sealing member sticks fast to the fuel feed nozzle.

According to the embodiment above-mentioned, when the tip of the fuel feed nozzle N inserted into the inner periphery sealing portion 12, the cam pins 82 start moving along the grooves 81. When the fuel feed nozzle N is further inserted, the cam pins 82 are moved toward the fuel feed port inner side A2 while forwardly rotated in the peripheral direction of the inner periphery sealing portion 12. This enables the inner tube portion 12b of the inner periphery sealing portion 12 to be twisted in the peripheral direction, causing the same to be reduced in diameter. Thus, the inner tube portion 12b can ultimately stick fast to the fuel feed nozzle N (See FIG. 15). This effectively hermetically seals the gap between the outer periphery of the fuel feed nozzle N and the inner periphery of the fuel feed port A. When fuel feeding Is completed and the fuel feed nozzle N is then moved toward the fuel feed port opening side A1 for removing the fuel feed nozzle N from the fuel feed port A, the stopper 4 is returned, while following the fuel feed nozzle N, to the original position by the biasing force of the second spring S2. Then, the receiving member 3, the cam pins 82, and the inner tube portion 12b of the sealing member 1 are moved toward the fuel feed port opening side A1 by the biasing force of the first spring S1. Consequently, the cam pins 82 are reversely rotated along the grooves 81 to gradually untwist the inner tube portion 12b, thus increasing the diameter thereof. This enables the inner tube portion 12b to be separated from the fuel feed nozzle N. Accordingly, the fuel feed nozzle N can be removed from the fuel feed port A without sliding contact with the inner tube portion 12b.

Figure 16:
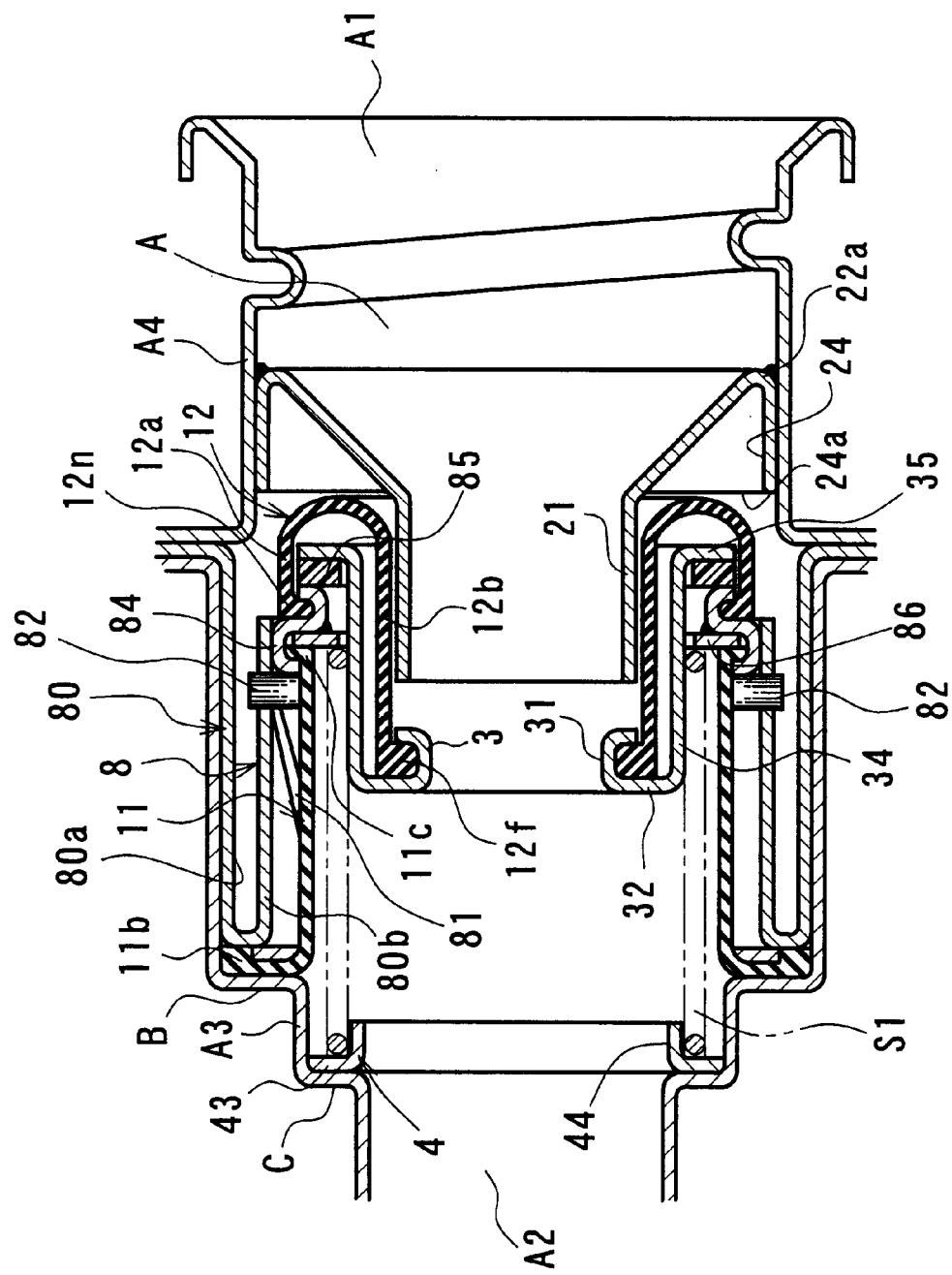
FIG. 16 is a section view of yet another embodiment of the present invention.
Figure 17:
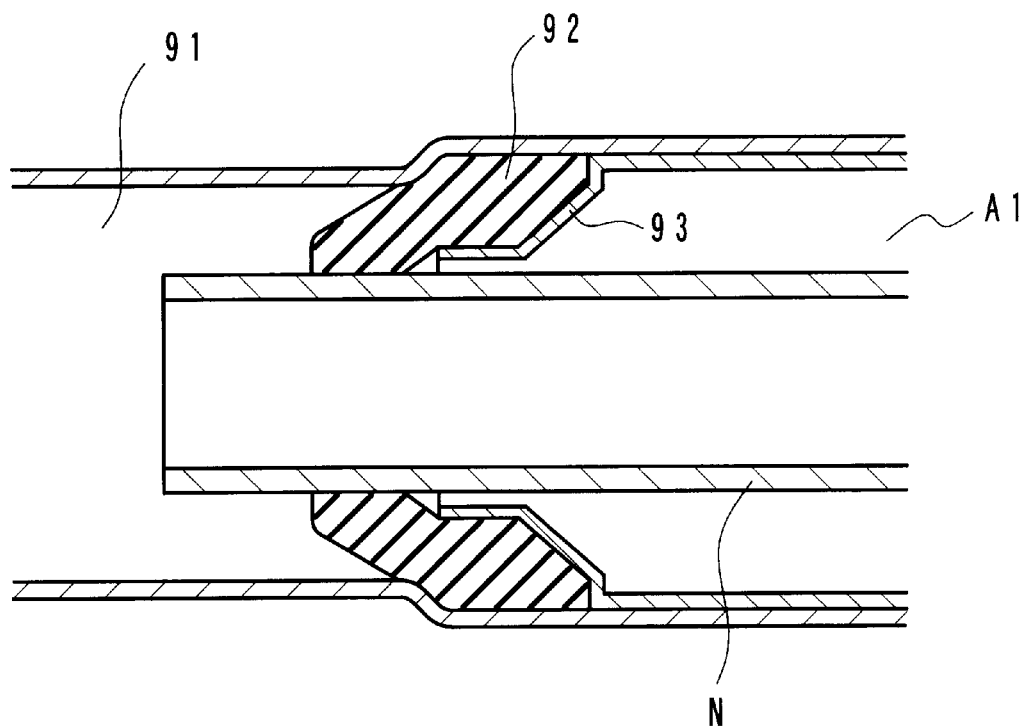
FIG. 17 is a section view of a fuel feed port sealing apparatus of prior art.

FIG. 16 is a section view of yet another embodiment of the present invention. In this embodiment, an outer periphery sealing portion 11 is formed of a single tube body. Its end portion 11b at a fuel feed port inner side A2 sticks fast to the inner periphery of the fuel feed port A while its end portion 11c at a fuel feed port opening side A1 is connected, through a movable ring 84, to an end portion 12n of the outer tube portion 12a at the fuel feed port inner side A2. A receiving member 3 which engages with an end portion 12f of an inner tube portion 12b at the fuel feed port inner side A2, has an outer tube portion 34 extending toward the fuel feed port opening side A1, instead of the short tube portion 33 mentioned earlier. The outer tube portion 34 is provided at its end at the fuel feed port opening side A1 with a flange 35 extending toward the outer tube portion 12a of the inner periphery sealing portion 12. Interposed between the flange 35 and the movable ring 84 is an annular thrust washer 85 made of a material low in coefficient of friction such as polytetrafluoroethylene (PTFE) or the like. This enables the movable ring 84 and the flange 35 to be relatively rotatable. A tube body 80 of a cam mechanism 8 has (i) an outer tube portion 80*a* fitted to the inner periphery of the fuel feed port A and (ii) an inner tube portion 80*b* which terminates at one end of the outer tube portion 80*a* and which is disposed with a gap provided with respect to the inner periphery of the outer tube portion 80*a*. The inner tube portion 80*b* is provided on opposite positions of the peripheral surface thereof with spirally extending grooves 81. Cam pins 82 serving as cam members are introduced in the grooves 81. The cam pins 82 are secured to the movable ring 84. The movable ring 84 is axially movably inserted in the inner periphery of the inner tube portion 80*b* of the tube body 80. The end portion of the first spring S1 at the fuel feed port opening side A1 abuts on a receiving ring 86 welded to the movable ring 84. Likewise in the embodiment shown in FIG. 8, the second spring S2 for biasing the stopper 4 is not disposed in this embodiment. FIG. 16 shows the arrangement in which the cam pins 82 are disposed at two positions, but an arrangement using a single cam pin may also be used.

According to the embodiment above-mentioned, when the receiving member 3 is moved toward the fuel feed port inner side A2 according to the insertion of the fuel feed nozzle N into the fuel feed port A, the cam pins 82 are pushed, through the movable ring 84, toward the fuel feed port inner side A2 and moved along the grooves 81. This causes the movable ring 84 to be forwardly rotated in the peripheral direction of the inner periphery sealing portion 12. Consequently, the outer tube portion 12*a* of the inner periphery sealing portion 12 is twisted in the peripheral direction. This twists the inner tube portion 12*b* of the inner periphery sealing portion 12 in the peripheral direction, causing the same to be reduced in diameter. Thus, the inner tube portion 12*b* ultimately sticks fast to the fuel feed nozzle N. When the fuel feed nozzle N is removed from the fuel feed port A, the cam pins 82 and the movable ring 84 are reversely rotated to gradually untwist the inner tube portion 12*b*. This enables the inner tube portion 12*b* to be separated from the fuel feed nozzle N.

The present invention is not limited to the embodiments above-mentioned, but a variety of modifications can be made. For example, in the embodiment shown in FIG. 1, the lip portion 12*d* may not be disposed, or the inner tube portion 12*b* may have a thinner portion, instead of the through-holes 12*e*, such that using this thinner portion, the inner tube portion 12*b* can readily be deformed.

What is claimed is:

1. A fuel feed port sealing apparatus comprising:
   a sealing member made of an elastic material for hermetically sealing the gap between the inner periphery of a fuel feed port and the outer periphery of a fuel feed nozzle inserted thereinto; and
   an insertion guide for aligning said fuel feed nozzle inserted into said fuel feed port with respect to said sealing member,
   said sealing member comprising:
      an outer periphery sealing portion arranged to stick fast to the inner periphery of said fuel feed port; and
      an inner periphery sealing portion to be moved toward the fuel feed port inner side according to the insertion of said fuel feed nozzle and to be moved toward the fuel feed port opening side according to the removal of said fuel feed nozzle,
   said inner periphery sealing portion being arranged such that, as moved toward said fuel feed port opening side, said inner periphery sealing portion is increased in inner diameter at its part into which said fuel feed nozzle is inserted, the inner diameter thus increased being greater than the outer diameter of said fuel feed nozzle, and that said part is reduced in inner diameter with the movement of said inner periphery sealing portion toward said fuel feed port inner side, causing said part to stick fast to the outer periphery of said fuel feed nozzle.

2. A fuel feed port sealing apparatus according to claim 1, wherein
   said inner periphery sealing portion of said sealing member has a tube portion to stick fast to the outer periphery of said fuel feed nozzle,
   said tube portion is provided at its end at said fuel feed port inner side with a metallic receiving member on which the tip of said fuel feed nozzle abuts, and
   said receiving member is biased toward said fuel feed port opening side by a spring.

3. A fuel feed port sealing apparatus according to claim 2, further comprising a stopper for regulating said inner periphery sealing portion of said sealing member from being moved, according to the insertion of said fuel feed nozzle, by a predetermined amount or more toward said fuel feed port inner side.

4. A fuel feed port sealing apparatus according to claim 3, wherein
   said stopper is disposed movably toward said fuel feed port inner side as biased toward said fuel feed port opening side by a spring, and
   in company with said stopper, said inner periphery sealing portion of said sealing member is moved with its shape maintained at the shape formed at the time when it has stuck fast to said fuel feed nozzle.

5. A fuel feed port sealing apparatus according to claim 4, wherein said outer periphery sealing portion has a tube portion opposite to the inner periphery of said fuel feed port, and said tube portion terminates at said inner periphery sealing portion with said tube portion turned back from its end at said fuel feed port opening side toward said fuel feed port inner side.

6. A fuel feed port sealing apparatus according to claim 1, wherein said inner periphery sealing portion has (i) an inner tube portion to stick fast to the outer periphery of said fuel feed nozzle, and (ii) a tapered tube portion extending radially outwardly of said inner tube portion with its diameter gradually increased toward said fuel feed port inner side.

7. A fuel feed port sealing apparatus according to claim 6, wherein said inner tube portion is provided at or in the peripheral surface thereof with a thinner portion or a through-hole to facilitate an increase or reduction in diameter of said inner tube portion.

8. A fuel feed port sealing apparatus according to claim 1, wherein
   said inner periphery sealing portion is formed by a tube body provided on the outer periphery thereof with an inclined surface gradually increased in diameter toward said fuel feed port opening side, and
   an annular portion extends along the outer periphery of said inner periphery sealing portion, said annular portion being arranged to come in sliding contact with said inclined surface to reduce the inner periphery sealing portion in diameter when said inner periphery sealing portion is moved toward said fuel feed port inner side.

9. A fuel feed port sealing apparatus according to claim 8, wherein a sliding contact ring of which diameter can be reduced, extends along said inclined surface of said inner periphery sealing portion, said sliding contact ring having wear resisting properties.

10. A fuel feed port sealing apparatus according to claim 1, further comprising a cam mechanism arranged such that according to the insertion of said fuel feed nozzle into said inner periphery sealing portion, a cam member connected to said inner periphery sealing portion of said sealing member, is forwardly rotated, while being moved toward said fuel feed port inner side, in the peripheral direction of said sealing member, thereby to twist said inner periphery sealing portion in the peripheral direction to reduce the diameter thereof, and that according to the removal of said fuel feed nozzle from said inner periphery sealing portion, said cam member is reversely rotated, while being moved toward said fuel feed port opening side, in the peripheral direction of said sealing member, thereby to untwist said inner periphery sealing portion to increase the diameter thereof.

11. A fuel feed port sealing apparatus according to claim 10, wherein said cam mechanism has a tube body which is disposed as aligned with said inner periphery sealing portion of said sealing member and which is provided in the peripheral surface thereof with a groove into which said cam member is introduced.

12. A fuel feed port sealing apparatus according to claim 10, wherein, said inner periphery sealing portion of said sealing member has a tube portion which sticks fast to the outer periphery of said fuel feed nozzle, said tube portion is provided at the end thereof at said fuel feed port inner side with a metallic receiving member on which the tip of said fuel feed nozzle abuts, said receiving member is biased toward said fuel feed port opening side by a spring, and said cam member is connected, through said receiving member, to said tube portion of said inner periphery sealing portion.

13. A fuel feed port sealing apparatus according to claim 12, wherein said cam member is a cam pin.

* * * * *

UNITED STATES PATENT AND TRADEMARK OFFICE
CERTIFICATE OF CORRECTION

PATENT NO : 6,079,581
DATED : June 27, 2000
INVENTOR(S): Hideharu Hashimoto; Nobuhito Hirakawa, both of Sanda; Takashi Kato, Okazaki, all of Japan It is certified that error appears in the above-identified patent and that said Letters Patent is hereby corrected as shown below:

On the cover page, column 1,

Change "Assignee: Nippon Pillar Packing Co. Ltd., Osaka, Japan"

To: -- Assignee: Nippon Pillar Packing Co., Ltd.,
Osaka, Japan
and
Futaba Industrial Co., Ltd.,
Aichi, Japan --

Signed and Sealed this

Thirty-first Day of October, 2000

Attest:

Q. TODD DICKINSON

Attesting Officer

Director of Patents and Trademarks